US011372755B2

(12) United States Patent
Akutsu et al.

(10) Patent No.: US 11,372,755 B2
(45) Date of Patent: Jun. 28, 2022

(54) STORAGE SYSTEM

(71) Applicant: HITACHI, LTD., Tokyo (JP)

(72) Inventors: Hiroaki Akutsu, Tokyo (JP); Akira Yamamoto, Tokyo (JP); Shigeo Homma, Tokyo (JP); Masanobu Yamamoto, Tokyo (JP); Yoshinori Ohira, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/931,640

(22) Filed: Jul. 17, 2020

(65) Prior Publication Data
US 2020/0356471 A1 Nov. 12, 2020

Related U.S. Application Data

(63) Continuation of application No. 15/806,644, filed on Nov. 8, 2017, now Pat. No. 10,733,092, which is a (Continued)

(51) Int. Cl.
G06F 12/02 (2006.01)
G06F 3/06 (2006.01)
G06F 12/1009 (2016.01)

(52) U.S. Cl.
CPC .......... G06F 12/0246 (2013.01); G06F 3/061 (2013.01); G06F 3/0604 (2013.01); (Continued)

(58) Field of Classification Search
CPC ............. G06F 12/0246; G06F 12/1009; G06F 3/0604; G06F 3/061; G06F 3/0647; G06F 3/0649; G06F 3/0662; G06F 3/0683; G06F 3/0685
See application file for complete search history.

(56) References Cited

U.S. PATENT DOCUMENTS 5,893,139 A 4/1999 Kamiyama
8,645,654 B1 2/2014 Bailey et al.
(Continued)

FOREIGN PATENT DOCUMENTS

JP 2004-272324 A 9/2004
JP 2005-276017 10/2005
(Continued)

OTHER PUBLICATIONS

International Search Report in PCT/JP2013/062317, dated Jul. 16, 2013.

*Primary Examiner* — Ryan Bertram
(74) *Attorney, Agent, or Firm* — Mattingly & Malur, PC

(57) ABSTRACT

A storage system monitors the first access frequency of occurrence which is the access frequency of occurrence from a host device during a first period, and the second access frequency of occurrence which is the access frequency of occurrence from a host device during a second period shorter than the first period. Along with performing data relocation among the tiers (levels) in the first period cycle based on the first access frequency of occurrence, the storage system performs a decision whether or not to perform a second relocation based on the first access frequency of occurrence and the second access frequency of occurrence, synchronously with access from a host device. Here the threshold value utilized in a decision on whether or not to perform the first relocation is different from the threshold value utilized in a decision on whether or not to perform the second relocation.

15 Claims, 27 Drawing Sheets

Related U.S. Application Data continuation of application No. 14/489,598, filed on Sep. 18, 2014, now Pat. No. 9,830,258, which is a continuation of application No. 14/206,096, filed on Mar. 12, 2014, now Pat. No. 8,880,830, which is a continuation of application No. PCT/JP2013/062317, filed on Apr. 26, 2013.

(52) U.S. Cl.
CPC .......... *G06F 3/0647* (2013.01); *G06F 3/0649* (2013.01); *G06F 3/0662* (2013.01); *G06F 3/0683* (2013.01); *G06F 3/0685* (2013.01); *G06F 12/1009* (2013.01); *G06F 2003/0697* (2013.01); *G06F 2212/7201* (2013.01)

(56) References Cited

U.S. PATENT DOCUMENTS

| | | |
|---|---|---|
| 9,026,765 B1 | 5/2015 | Marshak et al. |
| 9,058,280 B1 | 6/2015 | Boyle et al. |
| 9,898,224 B1 * | 2/2018 | Marshak ............... G06F 3/0647 |
| 2003/0140207 A1 | 7/2003 | Nagase et al. |
| 2004/0257857 A1 | 12/2004 | Yamamoto et al. |
| 2005/0216591 A1 | 9/2005 | Sato |
| 2008/0059718 A1 | 3/2008 | Tajima et al. |
| 2010/0332746 A1 | 12/2010 | Kassai |
| 2011/0066767 A1 | 3/2011 | Hyde, II et al. |
| 2012/0173834 A1 | 7/2012 | Callanan et al. |
| 2012/0246386 A1 | 9/2012 | Akutsu et al. |
| 2012/0254583 A1 | 10/2012 | Serizawa et al. |
| 2012/0278569 A1 | 11/2012 | Kawakami et al. |
| 2013/0212349 A1 | 8/2013 | Maruyama |
| 2013/0275653 A1 | 10/2013 | Ranade |
| 2013/0290598 A1 * | 10/2013 | Fiske .................... G06F 3/0625  711/103 |
| 2014/0032837 A1 * | 1/2014 | Nagasaki ............... G06F 13/16  711/114 |

FOREIGN PATENT DOCUMENTS

| | | |
|---|---|---|
| JP | 2007-272721 A | 10/2007 |
| JP | 2008-059438 | 3/2008 |
| JP | 2008-269344 A | 11/2008 |

* cited by examiner

FIG.7

| 701 | 702 | 703 | 704 | 705 | 706 |
|---|---|---|---|---|---|
| POOL NO. | VIRTUAL VOLUME NO. | LOGIC ADDRESS | POOL VOLUME NO. | LOGIC ADDRESS | MONITOR INFORMATION INDEX NO. |
| 1 | 1 | 0x0000 | 204 | 0x0040 | 1 |
| 1 | 1 | 0x0010 | 201 | 0x0050 | 2 |
| 1 | 2 | 0x0000 | 203 | 0x0020 | 3 |
| 1 | 2 | 0x0030 | 202 | 0x0040 | 4 |
| 1 | 2 | 0x0020 | 201 | 0x0010 | 5 |

| POOL VOLUME NO. (801) | PG NO. (802) | PHYSICAL DRIVE NO. (803) | PHYSICAL START ADDRESS (804) |
|---|---|---|---|
| 201 | 10 | 0x0000<br>0x1001<br>0x1002<br>0x1003 | 0x0000 |
| 202 | 11 | 0x1004<br>0x1005<br>0x1006<br>0x1007 | 0x0000 |
| 203 | 11 | 0x1004<br>0x1005<br>0x1006<br>0x1007 | 0x1000 |
| 204 | 12 | 0x1008<br>0x1009<br>0x100A<br>0x100B | 0x0000 |

| MONITOR INFORMATION INDEX NO. | LONG-CYCLE IO COUNTER (A SIDE) | LONG-CYCLE IO COUNTER (B SIDE) | TEMPORARY COUNTER | PRIOR TEMPORARY COUNTER EXPIRY TIME |
|---|---|---|---|---|
| 1 | 1000 | 2000 | 12 | 2013/4/8 12:30:45 |
| 2 | 613 | 12124 | 0 | 2013/4/8 10:10:23 |
| 3 | 232 | 123 | 4 | 2013/4/8 12:20:12 |
| 4 | 35 | 32 | 5 | 2013/4/8 10:30:47 |
| 5 | 2 | 325 | 62 | 2013/4/6 17:30:32 |

FIG.10

| POOL NO. | LOAD Lv (IOPS) | NUMBER OF PAGES |
|---|---|---|
| 1 | 0(0) | 1190 |
| | 0(10) | 123 |
| | 2(100) | 14 |
| | 3(1000) | 4 |
| | 4(10000) | 2 |
| 2 | 0(0) | 1190 |
| | 0(10) | 123 |
| | 2(100) | 14 |
| | 3(1000) | 4 |
| | 4(10000) | 2 |

505

| VIRTUAL VOLUME NO. | LOAD Lv (IOPS) | NUMBER OF PAGES |
|---|---|---|
| 1 | 0(0) | 1190 |
| | 0(10) | 123 |
| | 2(100) | 14 |
| | 3(1000) | 4 |
| | 4(10000) | 2 |
| 2 | 0(0) | 1190 |
| | 0(10) | 123 |
| | 2(100) | 14 |
| | 3(1000) | 4 |
| | 4(10000) | 2 |

DEMOTION QUANTITY MANAGEMENT TABLE

| Lv | NUMBER OF PAGES | SCHEDULED DEMOTION COUNTS | DEMOTION COUNTS | |
|---|---|---|---|---|
| 5 | 10 | 0 | 0 | ← Tier1 |
| 4 | 20 | 0 | 0 | |
| 3 | 100 | 10 | 5 | — DEMOTION THRESHOLD VALUE (=Dt) 2206 |
| 2 | 130 | 130 | 130 | |
| 1 | 70 | 0 | 0 | — LONG-CYCLE THRESHOLD VALUE (=T) 208A ← Tier2 |
| 0 | 200 | 0 | 0 | |

2201

MONITOR TABLE FOR EXTENSION PAGE (1)

| MONITOR INFORMATION INDEX NO. (901) | SHORT-CYCLE RELOCATING PAGE CLAMP MARK (2208) | SHORT-CYCLE PROMOTION EXECUTION TIME (2209) |
|---|---|---|
| 1 | ON | 2013/4/6 12:30:45 |
| 2 | OFF | 2013/4/6 10:10:23 |
| 3 | OFF | 2013/4/6 12:20:12 |
| 4 | OFF | 2013/4/5 10:30:47 |
| 5 | ON | 2013/4/4 17:30:32 |

| MONITOR INFORMATION INDEX NO. | CONTINUOUS SHORT-CYCLE LOAD TIME (St) | COUNTER EXPIRY VALUE (N) | CUMULATIVE VALUE OF SQUARES OF PERIOD WHERE IO OCCURS [DURING SAMPLING] | CUMULATIVE VALUE OF SQUARES OF PERIOD WHERE IO OCCURS [SETTING (PRIOR PERIOD)] |
|---|---|---|---|---|
| 1 | 10 SECONDS | 1 | 100 SECONDS | 200 SECONDS |
| 2 | 50 SECONDS | 2 | 100 SECONDS | 200 SECONDS |
| 3 | 1 HOUR | 20 | 100 SECONDS | 200 SECONDS |
| 4 | 20 MINUTES | 5 | 20 SECONDS | 40 SECONDS |
| 5 | 50 SECONDS | 2 | 100 SECONDS | 200 SECONDS |

STORAGE SYSTEM

This is a continuation of U.S. Ser. No. 15/806,644, filed Nov. 8, 2017, which is a continuation of U.S. Ser. No. 14/489,598, filed Sep. 18, 2014, now U.S. Pat. No. 9,830,258, which is a continuation of U.S. Ser. No. 14/206,096, filed on Mar. 12, 2014, now U.S. Pat. No. 8,880,830, which is a continuation of PCT/JP2013/062317, filed on Apr. 26, 2013. The entire disclosures of all of these applications are hereby incorporated by reference.

BACKGROUND

The present invention relates to an automated tiering control for a storage system and containing a plurality of levels.

Larger data volumes and diversified types of data as well as a wide variety of storage media within storage devices due to the spread of high-speed SSD (Solid State Drives) that are faster than HDD (hard disk drive) has made the placing of data into the appropriate storage media tier (or level) a difficult task. One technique for resolving this issue is an automated storage tiering function for storage devices to automatically store the data in the appropriate storage media according to the access frequency of occurrence of the data.

An automated tiering control function generally migrates the page to an upper tier (or level) (called promotion) when there is a large IO (input/output) frequency of occurrence on a page, and migrates the page to a lower tier (or level) (called demotion) when there is a small IO frequency of occurrence within a fixed cycle (load monitoring measurement period.) There is also a technology (e.g. US Patent Application Publication No. 2012/0246386A1) that samples two types of exponential moving averages (a value increasing-diminishing within a few cycles, and a value increasing-diminishing within many cycles) rewritten during the above cycle interval, and combines these two types of values, setting one index value or namely the IO frequency of occurrence (load index) in order to account for IO fluctuations within a short cycle.

SUMMARY

However, the technology disclosed in US Patent Application Publication No. 2012/0246386A1 has the problem that due to the sampling of the monitor at each specified cycle and the relocating, following up on a sudden and short-cycle load shorter than the above cycle was impossible. Moreover, attempting to simply set a short cycle on an order between several seconds and several minutes, results in relocating a large quantity of pages whose load diminishes in a short period, losing the long-cycle stable Tier 1 hit rate. Other issues are an increasingly large processing load on the controller that counts each monitor cycle, and the effect of a large load (drop in performance and drop in SSD endurance) on the cache and drive due to an increase in the page migration volume.

In order to resolve the aforementioned problems, the present invention provides a storage system to set the basic locating (or positioning) for a long-cycle load, and that decides to move the pages of a short-cycle load via a threshold value different from the long-cycle. More specifically, the storage system disclosed in these specifications includes a first storage device and a second storage device whose performance is superior to the first storage device. The controller provides a virtual volume including a plurality of logical areas to the host device, and after receiving a write request, allocates the storage areas in the first or second storage device to the logic area that received the write request, or relocates the data stored in the allocated storage areas between the first storage device and the second storage device and changes the allocations to the logical areas to the storage area as the relocation destination. The controller is featured in particular, in managing a first access frequency of occurrence which is the frequency of occurrence of access from the host device within a first period; and managing a second access frequency of occurrence which is the frequency of occurrence of access from the host device within a second period that is shorter than the first period; and along with performing a first relocating in a first period cycle based on the first access frequency of occurrence, implements a decision on whether or not to perform a second relocation based on the first access frequency of occurrence and the second access frequency of occurrence synchronously with access from the host device. Here, the threshold value utilized in the decision to perform the first relocation is different from the threshold value utilized in the decision to perform a second relocation.

The present invention is capable of locating data among tiers while taking an increase or decrease in sudden short-cycle load into account, and is capable of improving the data hit rate in high tiers.

BRIEF DESCRIPTION OF THE DRAWINGS

FIG. 7 is a drawing showing the structure of the dynamic mapping table;

FIG. 8 is a drawing showing the structure of the logical physical address conversion table;

FIG. 9 is a drawing showing the structure of the page monitor table for each page:

FIG. 10 is a drawing showing the structure of the pool frequency distribution table and the virtual volume frequency distribution table:

FIG. 22 is a drawing showing the table structure of the demotion quantity processing table and the table structure of the monitor table for the extension page;

FIG. 27 is a drawing showing the table structure for the parameter estimation method and streamlining.

DETAILED DESCRIPTION

Figure 1:
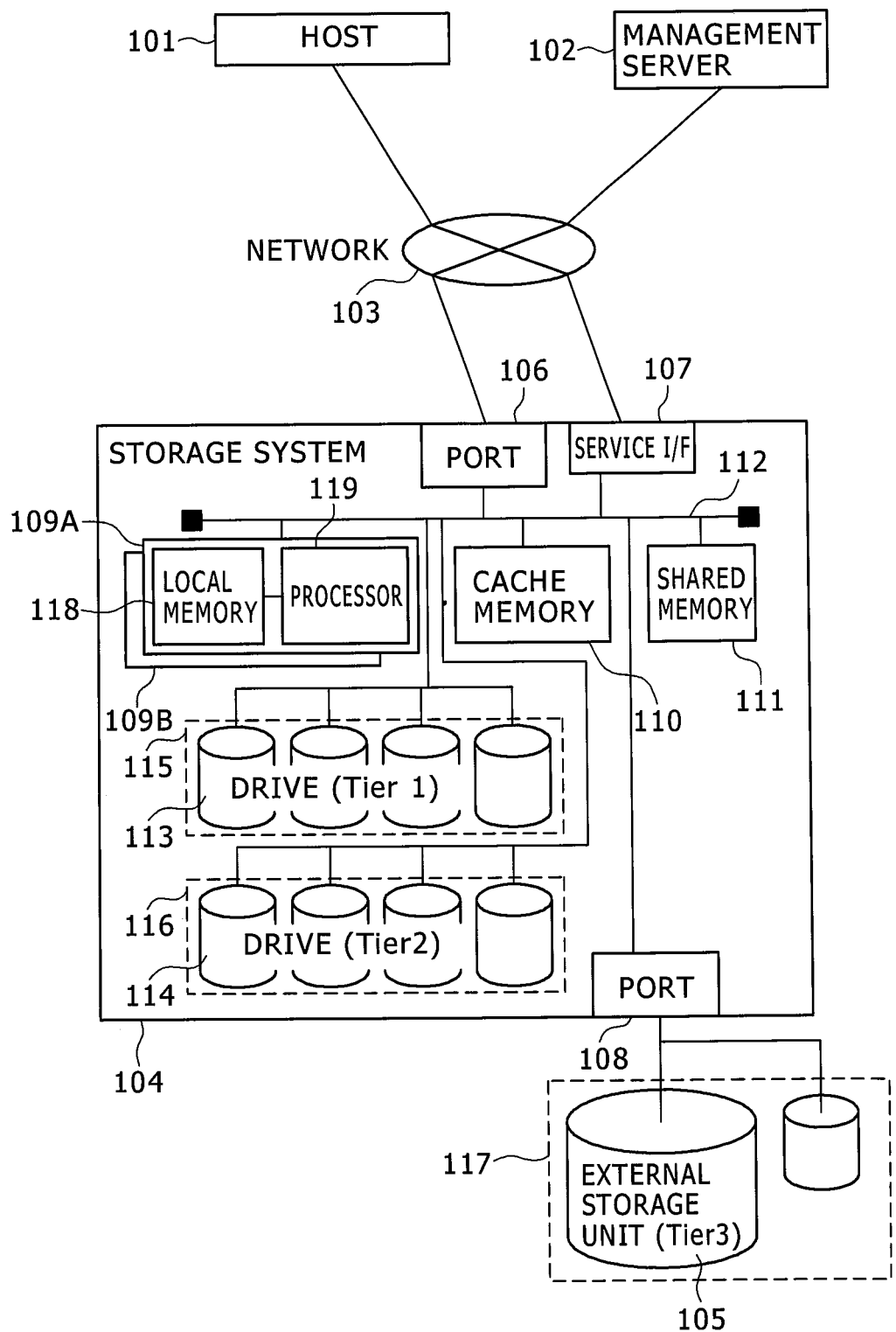
FIG. 1 is a block diagram showing a typical structure of the computer system of the first embodiment of the present invention.

The embodiments of the present invention are described next based on the accompanying drawings. In the drawings, elements having the same functions may be shown with the same reference numerals. The accompanying drawings show specific embodiments and examples conforming to the principle of the present invention. The embodiments and examples are intended for providing an understanding of the present invention; and are not for the purpose of limiting the interpretation of the present invention.

The embodiments of the present invention as described later on may be installed in software operated on a general-purpose computer, or may even be installed in dedicated hardware or may be implemented on a combination of software and hardware.

In the following description, the control information is described in a table format, however control information need not always be expressed as a data structure using tables and may be expressed by other methods such as a directory structure or data structures that include lists, DB, and queues, etc. So in order to show that the invention is not dependent on the data structure, the data structure such as "table" "list" "DB" or "queue", etc. may simply be called "information".

Hereafter each process in the embodiment of the present invention may sometimes be described using "program" as the subject of the action. The description may utilize the processor as the subject since the program implements the established processing by way of a processor while utilizing a memory and communication port (communication control device). The entire program or a portion of the program may be implemented by dedicated hardware, and moreover may be in a modular format. Each type of program may be installed in each computer by way of a program distribution server or storage media.

FIG. 1 is a block diagram showing a typical structure of the computer system of the first embodiment of the present invention. A host 101 is for example configured from an ordinary server, and is coupled to the port 106 of the storage system 104 by way of a network 103. The host 101 issues the data read and write commands on the storage system 104, and the storage system 104 performs reading or writing of the data according to that command. The network 103 is configured for example by SAN (Storage Area Network) or Ethernet (registered trademark), etc. A management server 102 is coupled by way of the network 103 to the service I/F port 107 or port 108 of the storage system 104. The storage administrator utilizes the management server 102 to send commands for each type of setting and control required for operating the storage system to the storage system 104. If coupled to an external storage unit 105, the external storage unit 105 is coupled to the port 108 of the storage system 104. The external storage unit 105 may be coupled by way of the network 103 to the port 108 of the storage system 104, when coupling to the external storage unit 105. The volume provided by the external storage 105 can be handled by the storage system 104 in the same way as the volume within the storage system 104. The specific method is described in patent document 2 so details are omitted here.

The internal structure of the storage system 104 is described next. Inside the storage system 104, the port 106, the service I/F 107, the processor package 109, the cache memory 110, the shared memory 111, the port 108, the drive 113, and the drive 114 are coupled by way of an internal network 112. The cache memory 110 is a memory capable of being accessed at high speed for temporarily storing (buffering) data as the cache in order to improve throughput and response in the IO processing in the storage system 104. The processor package 109 is configured from a local memory 118 and a processor 119 and a plurality of processor packages 109 may be utilized. The processor 119 for example executes data transfer processing among the drives 115, 116, the external storage unit 150 and the cache memory 110 in order to process read and write command from the host 101. The shared memory 111 is a memory for storing control information required by the processor 119 for the processing of read and write commands or executing of storage function (function for copying storage volume, etc.); and is also a memory for storing information jointly utilized by the processor 119 for the plurality of processor packages 109A, B. The local memory 118 is a memory that stores control information required by the processor 119 for processing of read and write commands, and the executing of storage functions, and is a area capable of being utilized by the processor 119. The local memory 118 stores for example programs to be executed by the processor 119.

The drives 113, 114 include plural types of drives having different functions. The drives 113, 114 are for example hard disk drives having interfaces such as FC (Fibre Channel), SAS (Serial Attached SCSI), SATA (Serial Advanced Technology Attachment), etc. Compared to hard disk drives, these drives include SSD (Solid State Drive) with high IO response performance and IO throughput performance. The layers (tiers) 115, 116, 117 are levels that group these plural types of drives into groups of drives having similar performance. The interrelation among tiers is defined by their vertical relationship. Typical high-performance drives (such as SSD) are configured from Tier 1 to Tier 2 and 3. Moreover, assuming the case where coupling to old types not used by drives during external unit storage, control may be implemented from the lowest tier assumed as providing the lowest performance and the user may also set a tier by way of the control I/F according to the external storage unit performance.

Figure 2:
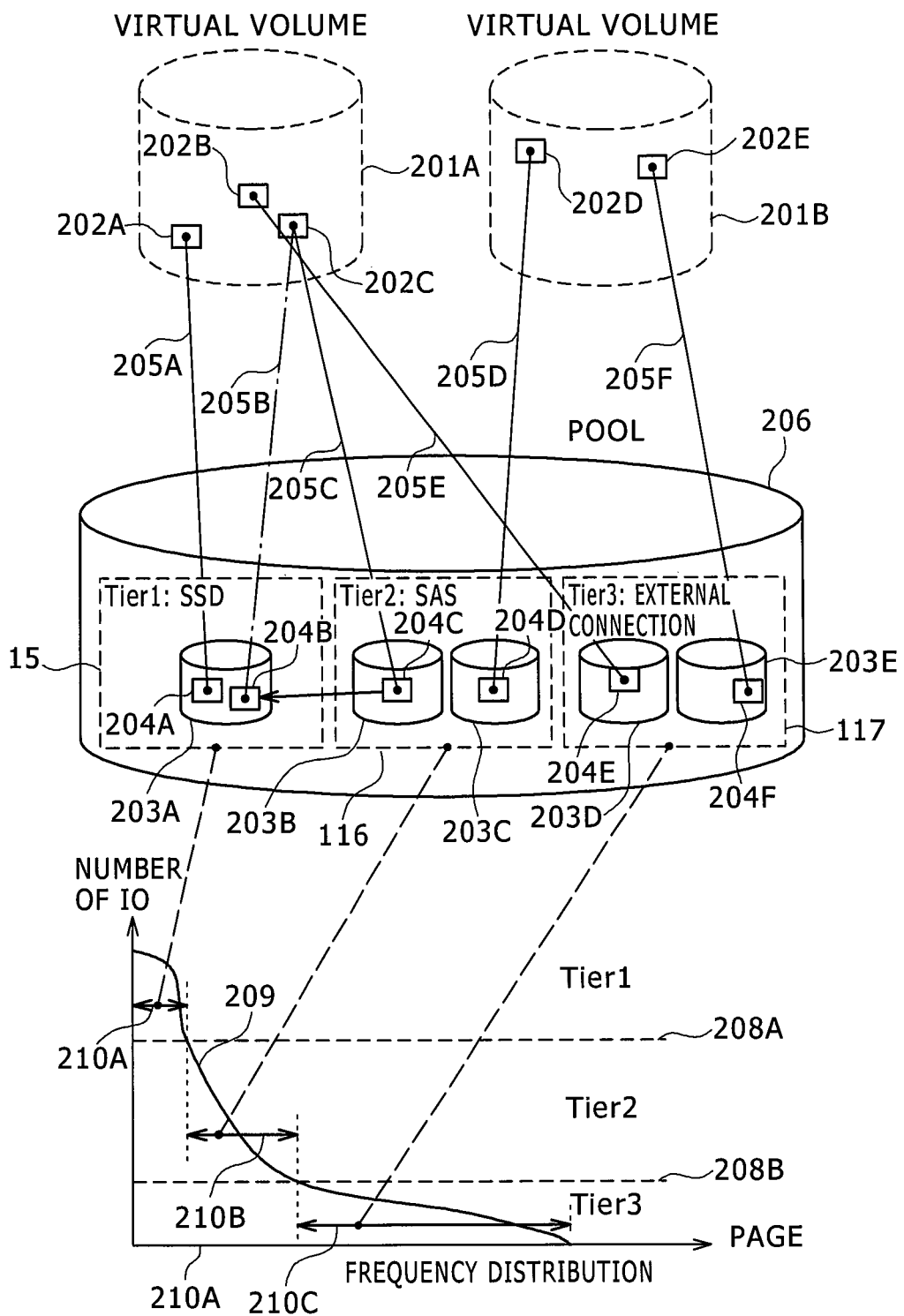
FIG. 2 is a block diagram showing the logical structure of the storage system of the first embodiment of the present invention.

FIG. 2 is a block diagram showing the logical structure of the storage system of the first embodiment of the present invention. The virtual volume 201 that the processor 119 provides to the host is a logical storage area recognized by the host 101 and the object of read or write command issued from the host 101. The pool 206 is comprised of one or more pool volumes 203. The pool volume 203 is comprised from any of the storage areas of the drive 113, 114, and drives of the external storage unit 105 and is grouped according to the level belonging to the drive. In the present embodiment, the pool 206 contains three levels which are an SSD level 115 (corresponding to the pool volume 203A), the SAS level 116 (corresponding to the pool volumes 203B, 203C), and the external unit connection level 117 (corresponding to the pool volumes 203D, 203E).

The processor 119 allocates unused storage areas from the pool 206 in specified units (pages) (205A), to the storage areas that are the object of write commands in the virtual volume 201 where the host 101 issued write commands. By executing IO processing in areas in the already allocated pool volume 203 on read and write commands next issued from the host 101 to the same page, processing is implemented just as if the host 101 is performing IO processing on the virtual volume. By utilizing the virtual volume 201, allocating pool areas to only utilized areas of the virtual volume 203, a limited storage capacity can be efficiently utilized.

Each page 202 configuring the virtual volumes includes IO processing features (called access localities) derived from the host. When for example, there is a mix of pages with a high IO frequency of occurrence and pages with a low IO frequency of occurrence, the pages with a high IO frequency of occurrence are located in the upper levels to permit approving overall system performance. The SSD level (115) for example can process 100 IOPS (input/output operations per second), and the SAS level (116) can process 100 IOPS. Here, when the SAS level is allocated to the page 202C containing the 50 IOPS features, and the SSD level is allocated to page 202A containing the 20 IOPS features, the storage system 104 can only exhibit overall performance for 10 (upper limit of SAS level)+25=35 IOPS since the IOPS rate from the host is basically a fixed volume in many cases. This state is called a neck (bottleneck). However, if the page 202C can be promoted (promotion=migrated upward) from the SAS to the SSD level, the storage system 104 would be able to exhibit overall performance for 50+20=70 IOPS.

Figure 16:
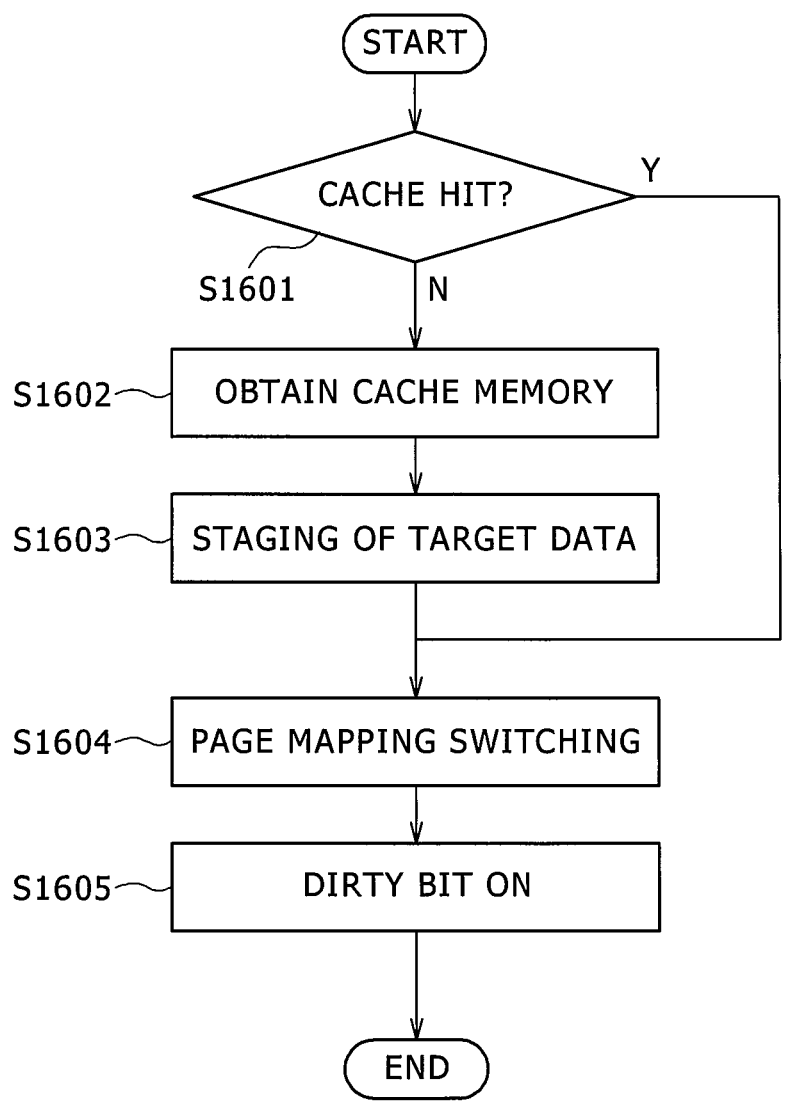
FIG. 16 is a flowchart expressing the operation of the page relocating processing program.

More specifically, to execute the above described promotion, the storage system 104 copies the data on page 204C onto the non-used page 204B, changes the link (205C) between page 202C of virtual volume 201A and page 204C of pool volume 203B, to the link (205B) between page 202C of virtual volume 201A and page 204B of pool volume 203A (S1604 in FIG. 16). The same structure is also capable of relocating the data by demotion.

The frequency distribution 207 expresses the distribution of the number of IO on each page. The graph 209 shows the IO number for each page on the vertical axis when all pages are arrayed in the order of high number of IO starting from the left. The tier allocation threshold value 208 (=T) is a threshold value that determines what number of IO on a page to allocate to what tier. On pages with a high number of IO, the pages for example belonging to the range 210A from the intersection of tier allocation threshold value 208A and frequency distribution in the graph 209 to the page with the highest capacity, is allocated to level 115 of Tier 1 (SSD in this embodiment). Also, the pages belonging to range 210B from the intersection of the tier allocation threshold value 208A and frequency distribution in the graph 209, to the tier allocation threshold value 208B and frequency distribution in the graph 209 are allocated to the level 116 of Tier 2 (SAS in this embodiment). The pages with the minimum number of IO from the intersection of tier allocated threshold value 208A and frequency distribution in the graph 209 are allocated to level 117 of the Tier 3 (external storage unit in this embodiment). Allocations can in this way be made from the upper level in the order of high number of IO.

The tier allocation threshold value 208 may be a value specified by the storage administrator or a value calculated by the storage system 104. The initial value (at stage when frequency distribution has not been made, after storage system startup) of the tier allocation threshold value 208 can for example be set to 0 and allocated from one upper level to the next.

Figure 3:
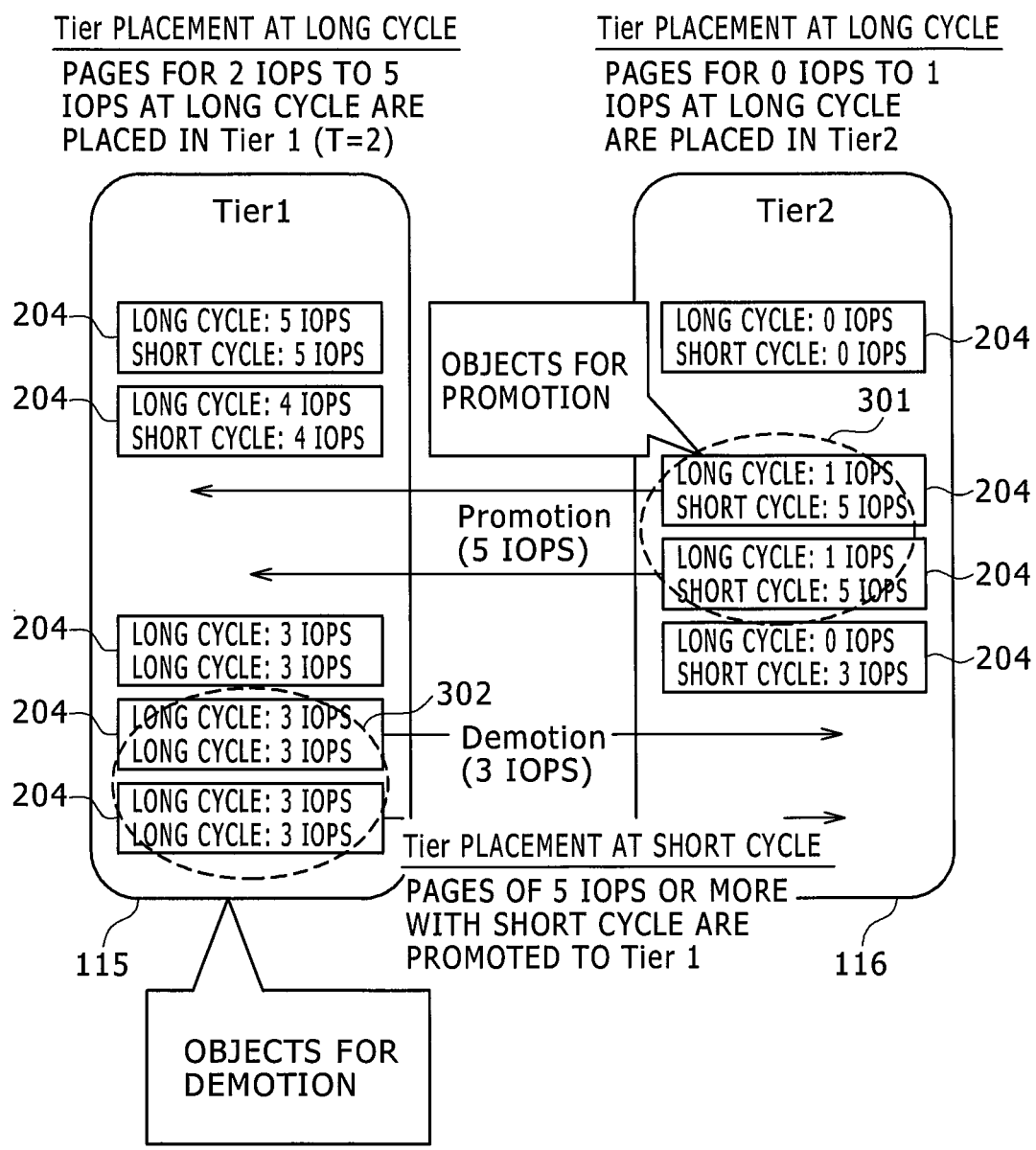
FIG. 3 is a drawing showing the approach to page locating in the present invention.

FIG. 3 is a diagram showing the approach to page placement (or location) in the present invention. First of all, in the present invention, the basic page placement is determined based on the established monitor cycle (long cycle). More specifically, a tier allocation threshold value 208 (shown by variable T) is set from the frequency distribution 207 of the pool made based on the long cycle monitor, and the pages are allocated. In the example in FIG. 3, the page with the long-cycle load (long-cycle IOPS) of T=2 or more is placed in Tier 1, and the page with the long-cycle IOPS that is below T=2 is placed in Tier 2. As described above, pages with a large IO load spanning a long cycle "as described above" can usually be expected to provide stable Tier 1 performance in view of the long cycle. Therefore in the present invention, the steady-state page placement level is set based on the long-cycle IOPS. However when analyzing general IO patterns, there are sometimes pages with extremely high continuous loads at short intervals (seconds to several minutes). Attempting to simply deal with these IO fluctuations by shortening the relocated cycles, results in relocating of a massive number of reduced load pages to a lower level in a short period so that the high level data hit rate sustains an overall loss.

Whereupon after setting the basic relocating based on the long cycle and taking the short-cycle load (short-cycle IOPS) into account, a solution is provided by implementing data relocating among layers used in combination with a reference different from the prior basic relocation. Namely, a target page for demotion in a short cycle is selected after judging a load as a long-cycle or short-cycle load based on a threshold value (tier allocation threshold value 208) that was set based on a long-cycle load; and selecting and relocating a page with a short-cycle IOPS that is a specified amount higher than the long-cycle/short-cycle load of the target page for demotion as target for promotion in a short cycle. Moreover, the short-cycle promotion/demotion is a sudden load, and rather than being dependent on the length of a pre-established period taking into account that weakening will probably occur faster than the cycle, decides whether tier movement is required synchronously with the IO. Utilizing this configuration allows boosting the overall Tier 1 hit rate by also locating pages with sudden high IO (frequency of occurrence) in Tier 1, while taking into account the need for a long-cycle stable Tier 1. In the page shown by 302 for example, a long-cycle IOPS is 3 IOPS that is the lowest long-cycle load among the pages in Tier 1 and the short-cycle IO is also 3 IOPS. The page shown by 301 is a short-cycle IOPS of 5 IOPS, and is a higher IOPS than the long-cycle IOPS for demotion target of 3 IOPS so that temporarily interchanging these pages allow achieving a Tier 1 with a hit rate higher than the case where only locating by long cycle.

Short-cycle promotion/demotion should fundamentally be performed while giving priority to demotions from Tier 1 in order to obtain free (available) page areas for promotions to Tier1 (topmost level) and in order to execute such promotions. Other than in special cases such as high loads, the drive response from Tier 1 is the smallest. Therefore, setting Tier 1 located at the topmost level as the relocating destination for performing a single cycle promotion will prove most effective in shortening the overall average response.

In view of the above description, the Tier 1 in the example of this embodiment is a target for short-cycle relocating but if there are three or more Tiers, the target may also include short-cycle relocating containing levels lower than Tier 1. Likewise, short-cycle relocating target may be dynamically set in order of priority of small average drive response in each tier. Response for example will vary according to the drive operating rate of each tier. So when the Tier 1 operating rate is extremely high, the response may exceed the response time from Tier2 onwards. If the average drive response for Tier 1 is 10 ms, when the average drive response for Tier 2 is 5 ms, the promotion and demotion as disclosed in these specifications may be implemented on promotions to Tier 2 and demotion for obtaining an empty page area for those promotions.

Figure 5:
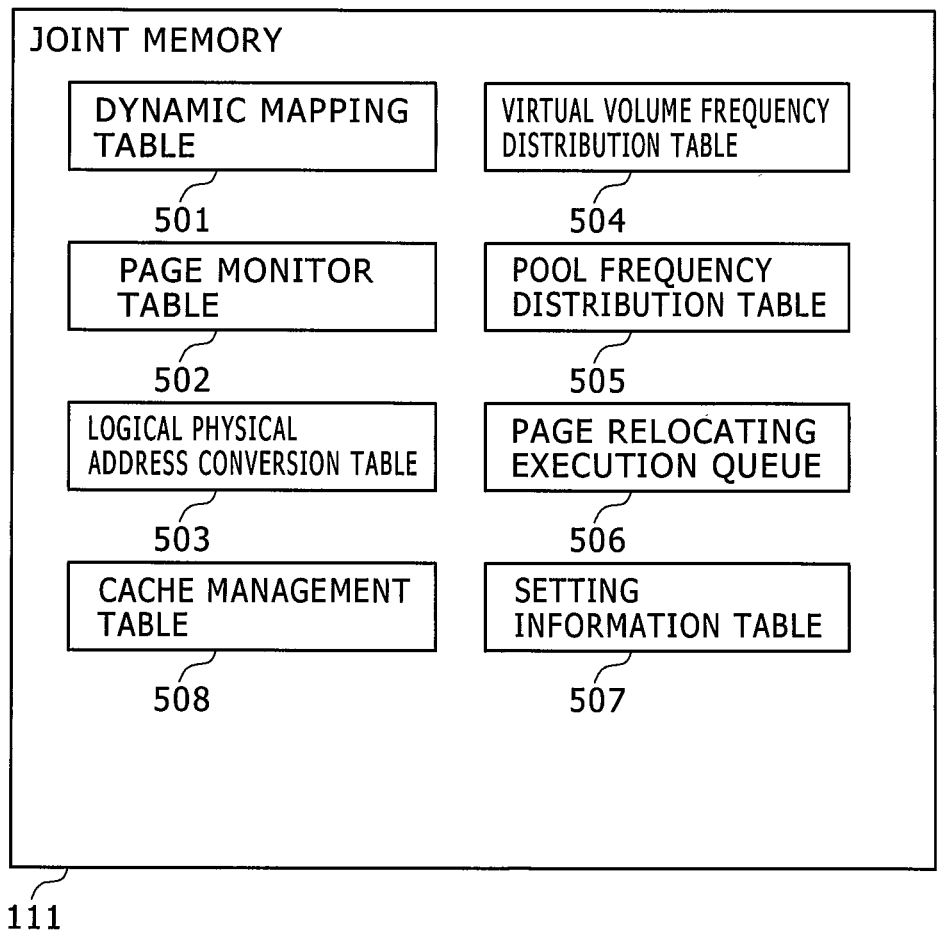
FIG. 5 is a drawing showing the types of table located in the shared memory.
Figure 6:
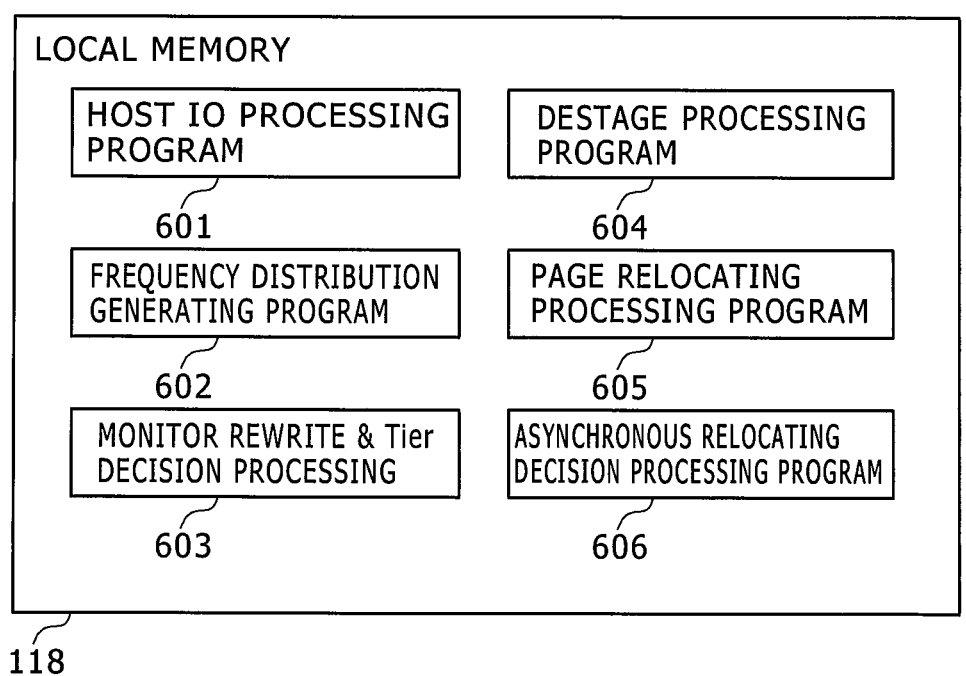
FIG. 6 is a drawing showing the types of programs located in the local memory.

FIG. 5 shows a table located in the shared memory 111. FIG. 6 shows a program stored in the local memory 118. The locations for locating these tables and programs are not limited to locations similar to the examples, and besides each local memory 118 may utilize the shared memory 111 and drive 113 and so on and also be the hierarchically managed volume between these elements.

The dynamic mapping table 501 is a table for managing the corresponding relation among each page of the virtual volume 201, the areas in the allocated pool volume 203, and the monitor information on the relevant page. The logical physical address conversion table 503 is a table for managing the corresponding relation among the parity group (PG), pool volume, and the addresses on the physical disk storing data for the pool volume. The page monitor table 502 is a table for managing the monitor information for each page including the number of IO. The virtual volume frequency distribution table 504 is a table for managing the distribution of the number of pages for each IO range, relating to the virtual volume. The pool frequency distribution table 505 is a table for managing the distribution of the number of pages for each IO range, relating to the pool. The page relocating execution queue 506 is a standby queue utilized when implementing page relocation. The setting information table 507 is a table for managing each type of parameter set from the control I/F, etc. The cache management table 508 is a table for retaining the dirty/clean state management of the data in the cache memory when storing data in the cache memory 110. When caching write data into the virtual volume, the table manages the correspondence between the address in the cache memory 110 and the address specifying the page of the virtual volume 201.

Figure 14:
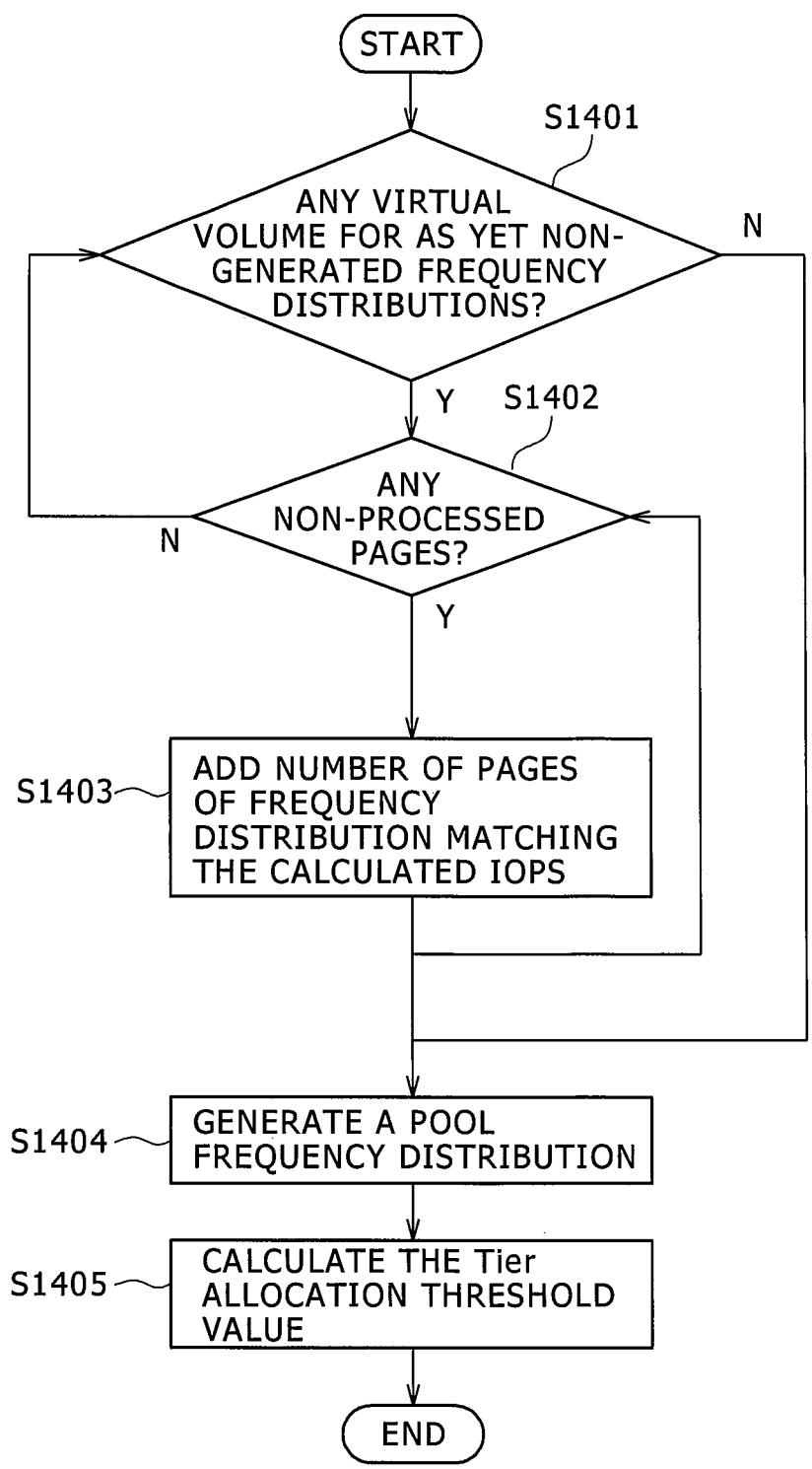
FIG. 14 is a flowchart of the frequency distribution generating program.

The processor 119 runs the program described in FIG. 6. The host IO processing program 601 is a program that processes read and write requests for the virtual volume 201 when an IO is received from the host 101. The destage processing program 604 is implemented asynchronously from the host IO, and is a program for storing data not reflected in the physical disk on the cache memory, into the physical disk. The frequency distribution generating program 602 is implemented in a specified cycle (specifically, long-cycle intervals) and is a program for calculating the tier allocating threshold value. The monitor rewrite & tier decision processing 603 rewrites each type of information in the page monitor table 502, and synchronizes the page tier movement decision with the host IO processing program 601. This program performs promotion to Tier 1 or demotion to Tier 1. The asynchronous relocating decision processing program 606 starts up when generating of the frequency distribution in FIG. 14 is complete, checks the page monitor table 502 in the specified cycle and executes an appropriate tier decision for each page. This program executes operations other than promotion to Tier 1. The page relocating processing program 605 is a program for relocating the page and is executed in cycles.

The page monitor table 502 or the pool frequency distribution table 505 may be located in the host 101 or the management server 102, and in this case the frequency distribution generating program 602 is operated on the host 101 or management server 102.

An example of the dynamic mapping table 501 is shown by way of FIG. 7. One entry on the dynamic mapping table links the pool area allocated to the relevant page, with the page in the virtual volume. Pages in the virtual volume are identified by the virtual volume No. 702, and the start logical address 703 on the relevant page within the relevant virtual volume. Moreover, each area within the relevant virtual volume is identified by the pool No. 701 and pool volume No. 704, and the start logical address 705 in the relevant area of the pool volume. The monitor information on the other hand is identified by the monitor information index No. 706. The relevant monitor information index No. corresponds to the monitor information index No. 901 in the page monitor table 502 but may also be directly stored as an element in the dynamic mapping table 901. The dynamic mapping table 501 manages the default value page storing the specified initial data (such as 0). In view of the need for efficient utilization of capacity, there may be at least one or more default value pages in a pool. Areas in virtual volumes where data has not been written even once are specified and the address of the default value page is stored in the logical address and the pool volume No. corresponding to the logical address 703 in the virtual volume 702.

The dynamic mapping table 501 manages the pool volume No. and the logical addresses specifying the non-allocated page in the virtual volume within the pool 206. A correspondence is formed between the pool volume No. and logical address of the empty page, and logical address 703 of the write destination, when data is first written from the server into a location where data had never been written even once in the logical address 703 of the virtual volume 702.

FIG. 8 is a drawing showing the structure of the logical physical address conversion table 503. One entry in the logical physical address conversion table shows the corresponding relation between the pool volume 204, PG (parity group) No. for storing data in the relevant pool volume and area of the physical drives (113 or 114). The pool volume is identified by the pool volume No. 801. The plurality of pool volumes are defined in the PG. The PG corresponding to the pool volume is identified by the PG number 802. The physical drive areas corresponding to the PG are identified by No. 803 of the physical drive, and the start address 804 of the physical drive.

The pool volume expresses the unit of increase and decrease in the pool. However, the units for this increase may be PG itself and not the logical VOL defined on the PG. The pool volume 704 and the logical address 705 stored in the dynamic mapping table may in this case also serve as addresses on the PG.

FIG. 9 shows the structure of the page monitor table 502. One entry in the page monitor table indicates monitor information for the specified page 202 identified by the monitor information index No. 901. The IO counter 902 stores the number of IO for a specified cycle. The cycle is the same cycle as the operation cycle of the previously described frequency distribution generating program 602. The frequency distribution generating program 602 targets the number of IO of the specified cycle for processing.

A long-cycle IO counter (A side) 902A and a long-cycle IO counter (B side) 902B are used in the present embodiment. Among these counters, one counter can be utilized by way of the IO processing program 601 and the destage processing program 604 as a monitor sampling counter; and the other counter can be switched for use as a counter among the frequency distribution generating program 602, the monitor rewrite & tier decision processing 603, and the asynchronous relocating decision processing program 606, so that processing to decide the tier utilizing defined monitor data from the prior cycle and relocate the page, can be performed in parallel with sampling of the monitor.

The temporary counter 903 is utilized for measuring the short-cycle IO. This counter shows how many times the IO were counted in the period from the prior temporary counter expiry time 904 until the current time. When the value on the temporary counter 903 has been counted up to N number of times (=temporary counter expiry value), the prior temporary counter expiry time 904 is rewritten to the current time, and the temporary counter set to 0 again. At the time that the temporary counter 903 reaches 0, a cycle for the IOPS different from the long cycle is counted by dividing (prior temporary counter expiry time 904−current time) by N. By counting the load as described above, the shorter the period until reaching the N count (the higher the IOPS) the shorter the short-cycle load that can be measured without having to depend on the specified cycle for setting the tier threshold value.

The information quantity expressing the difference in the N count of the temporary counter 903 can be located in a local memory having short and small capacity access latency, and just the expiry time of the prior temporary counter can be placed in a large capacity shared memory. In this way, accesses for one time in 1/N times can be set in a shared memory having a generally long access latency, and the effect of an increased processor load for IO processing can reduced, without having to use a large capacity of the local memory due to the temporary counter local expiry time.

The page monitor table 502 contains the read/write rate (or read quantity/write quantity) or sequential rate (or method for judging average IO length or sequential characteristics (judging IO continuity, etc.)) and this information may also be utilized when deciding the tier. For example pages with a high write rate set cache hits in the cache memory so that pages with a high read rate are preferably given priority and placed in Tier 1. If the Tier 1 is SSD, pages with a high read rate may for example be given priority and placed in Tier 1 with the goal of maintaining the SSD endurance.

The page monitor table 502 contains the moving average counter. By setting a value calculated as the moving average (exponential moving average, simple moving average) over plural cycles, the content of the present invention can be combined with the technology disclosed in related art 1 for example to efficiently avoid unnecessary demotion due to cyclic load drops such as occurring during weekends, etc.

FIG. 10 is a drawing showing the structure of the pool frequency distribution table 505 and the virtual volume frequency distribution table 504. The pool frequency distribution table 505 manages the distribution of the number of pages for the range of each IO number (quantity) for the pool 206. One entry of the pool frequency distribution table shows the range of the number of IO for a certain pool and the number of pages included in the relevant range of the number of IO. The load level 1002 is grouped into levels according to the extent of the load. The value within the parentheses in the load level 1002 shows the IOPS start value defined for each level. The end value for the relevant load level range is (a start value for the range of the number of IOPS for the next entry −1) (when the IOPS is a positive integer). The page number 1003 corresponds to the number of pages included in the range of the relevant load level 1002. This table also manages the tier allocation thresholds value 208. The tier allocation threshold value 208 may be a value equal to or more than an IOPS of 0 and need not be the boundary value of each range. The tier allocation threshold value may also utilize the load level as a value.

The virtual volume frequency distribution table 504 is a table for managing the distribution of the number of pages 1006 for each range 1005 of the number of IO in the virtual volume 201. The table structure is identical to the pool frequency distribution table 505.

Figure 11:
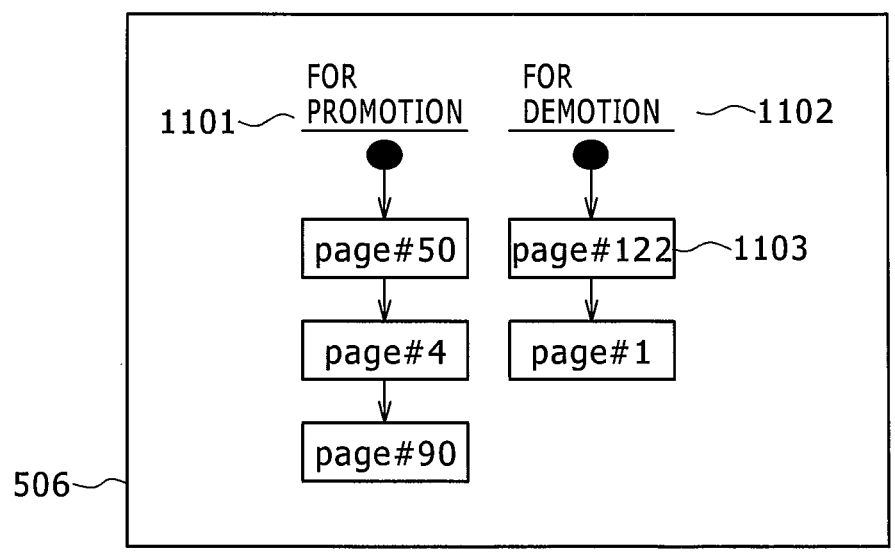
FIG. 11 is a drawing showing the structure of the page relocating execution queue.

FIG. 11 shows the structure of the page relocating execution queue 506. The page relocating execution queue 506 is grouped into a promotion queue 1101, and a demotion queue 1102. These queues may be retained in storage system units, pool units or PG units, and pool volume units.

The monitor rewrite & tier decision processing 603 or the asynchronous relocating decision processing program 606 enqueues the entry 1103 into each queue according to the moving pattern (promotion or demotion) when decided that page movement is required from the tier decision results utilizing the various threshold values. The entry includes referral to the movement destination page (equivalent to the pool volume No. 704 and logical address 705) and referral to the movement source page (equivalent to the pool volume No. 704 and logical address 705). Here, referral is the search for information in the page monitor table and dynamic mapping table.

The page relocating processing program performs the page relocating (process that rearranges the referral and data copy from the movement source physical page to the movement destination physical page for the pool volume page (physical page) corresponding to the virtual volume page (virtual page,)) based on the enqueued entry in the present queue. In a typical environment, the maximum relocation performance fluctuates according to the load size at the drive side, due to the host IO. By utilizing the present queue, stable relocation can however be achieved even when the maximum relocation performance fluctuates during relocation.

Figure 12:
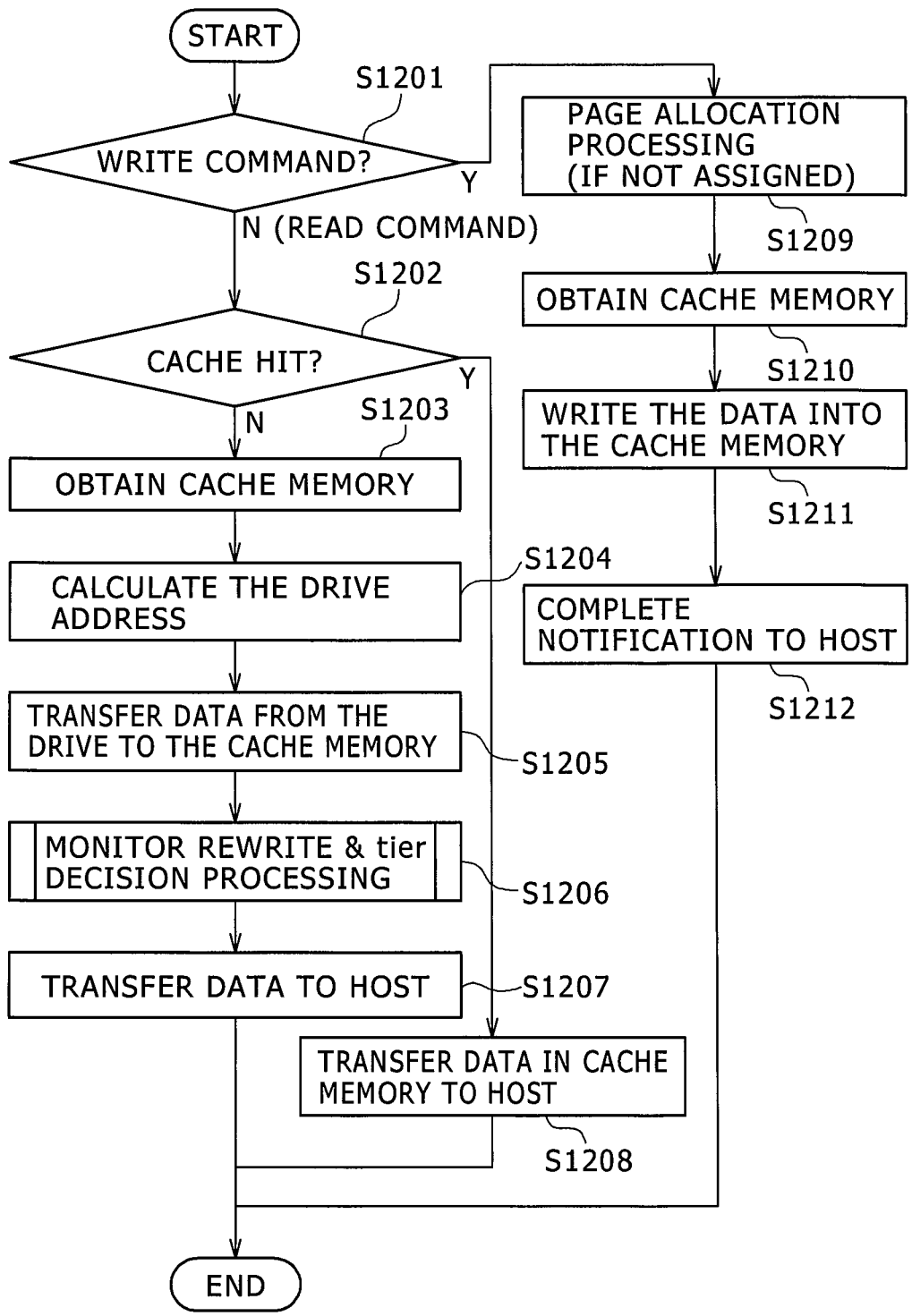
FIG. 12 is a flowchart showing the processing in the host IO processing program within the storage system when the host reads-writes data on the virtual volume.

FIG. 12 is a flowchart showing the processing for reads-writes data on the virtual volume 201. The host IO processing program 601 executes the program flow when an IO processing request is received from the host 101.

The host IO processing program 601 decides the received IO processing request is a data read request or a data write request for the virtual volume 201 (S1201). If the IO processing request is a write request, then the program refers to the dynamic mapping table 501 and decides whether or not allocation of the relevant virtual page to a pool page was completed. If not yet allocated, an unused page is allocated from the pool (S1209).

The host IO processing program 601 checks whether or not a area corresponding to the address on the virtual volume matching the IO processing request has been obtained in the cache memory 110, and obtains a area in the cache memory 110 if obtained or if not obtained (S1210). The host IO processing program 601 next replies that transfer of write data to the host is possible, and writes the write data transferred from the host into the obtained area in the cache memory, and erects a dirty flag in the cache management table 508 since there is no writing area in the disk (S1211). The dirty flag is information showing a state where data in the cache memory is not reflected in the disk, and is retained in the cache management table 508 that manages the cache memory area. The host IO processing program 601 replies to the host that IO processing is complete (S1212), and the IO processing program ends.

In S1201 on the other hand, if the IO processing request is a read request, the host IO processing program 601 checks whether or not there is data corresponding to the address on the virtual volume matching the IO processing requirement in the cache memory (cache hit) (S1202). If there is a cache hit, the data in the cache memory is transferred to the host (S1208). After transferring all of the data requested by the host to the host, a read processing complete response is sent to the host, and the IO processing program ends.

If there was a cache miss (no corresponding data) in S1202, a area of the cache memory is obtained for storing data corresponding to the address of the read request destination virtual volume (S1203). Next, the dynamic mapping table 501 is utilized to check whether or not a page 202 from the pool was allocated to the read request destination virtual volume address of the host. If not allocated, the dynamic mapping table 501 is utilized to calculate the address of the drive on the page where the default value is stored (S1204), and the default value from the drive is transferred to the cache memory area that was obtained (S1205).

If a page 202 was allocated to the read request destination virtual volume address, the dynamic mapping table 501 is utilized to find the allocated logical address and the pool volume No., and moreover the logical physical address conversion table 503 is utilized to find the physical drive No. and the physical start address (S1204). Next, the data is transferred from the calculated drive address to the area of the cache memory that was obtained (S1205).

During transfer of data to the cache memory, each type of information for the page monitor table 502 corresponding to the monitor information index No. of the dynamic mapping table 501 is rewritten and the tier decision process executed (S1206). Next, the data stored on the cache memory from the drive is sent from the relevant cache memory to the host (S1207). After transferring all of the data requested by the host, a read processing complete response is transferred to the host, and the IO processing program ends.

Figure 13:
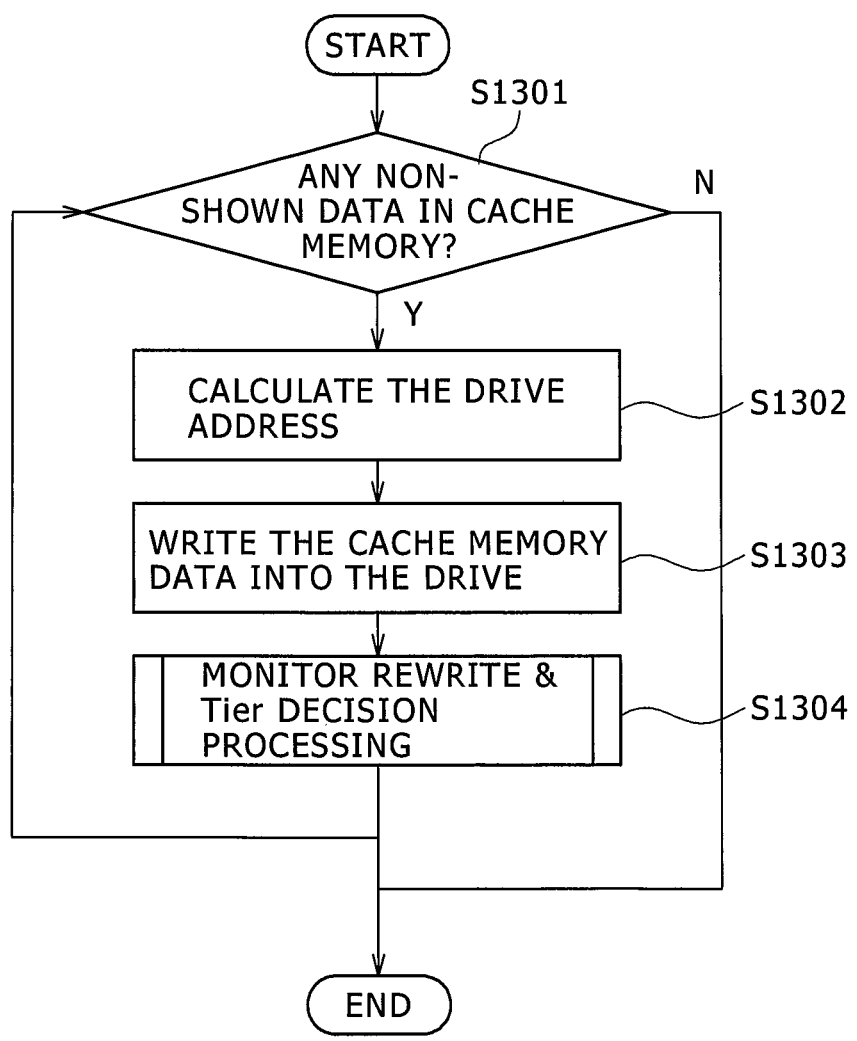
FIG. 13 is a flowchart showing the destage processing program.

FIG. 13 is a flowchart showing the destage processing program 604. The IO processing program as described in FIG. 12, erects a dirty flag after writing the write data from the host into the cache memory according to the data write request from the host.

The destage processing program 604 refers to the cache management table 508, and periodically checks whether there is a dirty flag in the cache memory updated in step S1211(S1301). If there is a cache area where a dirty flag has been updated, the logical address and the pool volume No. allocated from the dynamic mapping table 501 are found based on the logical address and the virtual pool volume No. of the cache management table 508.

If at this time the pool volume No. and the logical address are the address of the default page, then a new empty page is allocated from the dynamic mapping table 501 in order to write the new data. The pool volume No. and the logical address of the newly allocated page are then matched to the virtual volume No. and the logical address corresponding to the present destage processing of the dynamic mapping table 501 and stored. After finding the pool volume No. and logical address, the address of the drive is found in the logical physical conversion table (S1302). The dirty data in the cache memory is written into the drive address found in S1302 (S1303). Here, the dirty flag for the relevant data is set to OFF and a clean state is attained.

The IO counter value for the page monitor table 502 corresponding to the monitor information index No. of the dynamic mapping table 501 is then rewritten and tier decision processing implemented (S1304). A check is made of the cache memory for any as yet un-reflected data. If there is no un-reflected (or non-shown) data the processing ends, and if there is un-reflected data the processing is implemented again from S1302.

FIG. 14 is a flowchart of the frequency distribution generating program 602. A check is made to find if there are any virtual volumes for as yet non-generated frequency distributions (S1401). If there are non-generated virtual volumes then a check is made from the beginning volume to find whether there are any non-processed pages or not, in order to generate frequency distributions within the relevant virtual volume (S1402). If there are unprocessed pages, the long-cycle IOPS is calculated, and the number of pages for the load level of the matching frequency distribution are added (S1403). The long-cycle IOPS can be calculated for example by dividing the value of the long-cycle I/O counter 902 sampled in the immediately prior cycle by the cycle (in seconds). Therefore the IOPS sample cycle and the cycle of this frequency distribution generated processing are preferably the same value. As already described for FIG. 9, the moving average value may also be calculated as the long-cycle IOPS.

If the frequency distribution generating program 602 returns to S1402 and executing or processing of the volume from the rear end reveals that there is no unprocessed page in the virtual volume, the frequency distribution generating program 602 returns to S1401 in order to check whether or not there are any other virtual volumes. The frequency distribution generating program 602 next generates a frequency distribution for the pool (S1404). The pool frequency distribution is calculated by calculating the total value of the virtual volume frequency distributions. More specifically, the total sum of the number of pages 1003 matching the number of IO 1005 in each virtual volume No. 1004 belonging to the target pool is found in the virtual volume frequency distribution table 504, and is stored as the number of pages 1005 matching the number of IO 1005 in the pool frequency distribution table 505.

Next, the tier allocation threshold value 208 is calculated and set (S1405). There is a method for calculating the tier allocation threshold value 208 for each tier for the range 210 of the maximum page allocation amount from a limit point of either the potential of the tier (maximum number of IO that can be processed) or the capacity of the tier and then calculating the tier allocation threshold value 208 from an intersection of the range 210 and the frequency distribution graph 209. A method of using a threshold value designated by the user from a management terminal, and so on may be employed.

Figure 15:
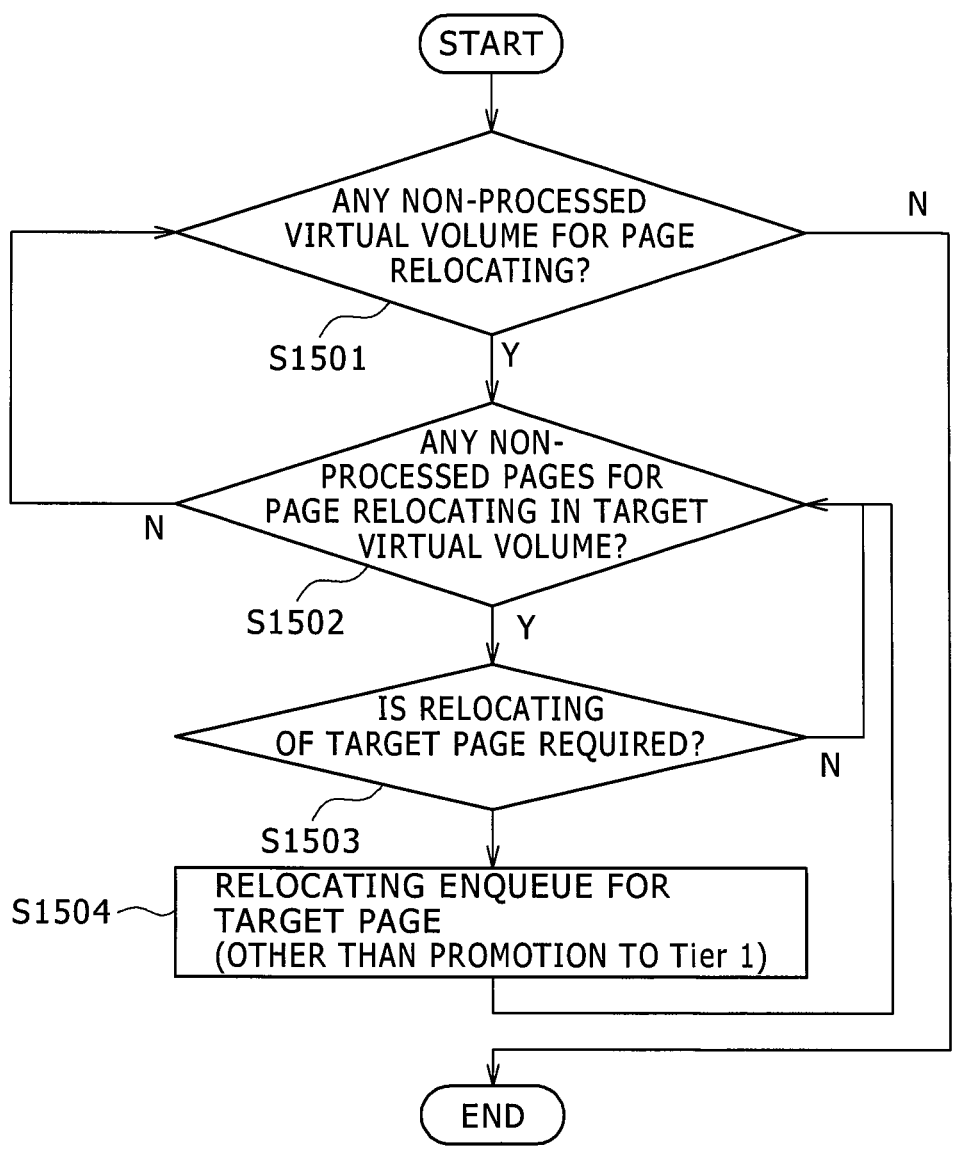
FIG. 15 is a flowchart of the asynchronous relocating decision processing program.

FIG. 15 is a flowchart of the asynchronous relocating decision processing program 606. The main task of the asynchronous relocating decision processing program 606 is the movement of data other than for promotion to Tier 1, and recovery (demotion to Tier 2 or Tier 3) when the IOPS of a promoted page has become low in a short-cycle IOPS. The promotion to Tier 1 is executed by separate priority by the monitor rewriting & tier decision processing and so need not be executed by the asynchronous relocating decision processing program 606. However, assuming for example that there was no host IO for a page promoted to the Tier 1 via short-cycle IOPS, then no page migration (or movement) decision was made by the monitor rewriting & tier decision processing so it might possibly be held up in Tier 1. Therefore, executing the asynchronous relocating decision processing program 606 to perform recovery (demotion from Tier 1 to Tier 2 or Tier 3) will allow efficient usage of the Tier 1 capacity.

First of all, a page relocation program (also called asynchronous relocating decision processing program) checks whether or not there are any non-processed virtual volumes for page relocating (S1501). If there is a non-processed virtual volume for page relocating, the page relocation program checks for each allocated page sequentially from the beginning of the target virtual volume to its end, as to whether relocation is required or not (S1502, S1503). This check of whether relocation is required or not is a judgment of whether page can be allowed to remain to stay in the currently located tier or the page should be migrated to a different tier, based on the long-cycle IOPS and short-cycle IOPS of the page and the tier allocation threshold value 208 in the pool frequency distribution table 505 of the target pool. Namely, the tier allocation threshold value 208A for Tier 1 and Tier 2 and the tier allocation threshold value 208B for Tier 2 and Tier 3 are compared with the number of IO of the IO counter 902 on the target page. Here, if the value for the long-cycle IOPS is smaller than the tier allocation threshold value 208A and larger than the tier allocation threshold value 208B and moreover the current tier for the target page was Tier 1, then the target page should be demoted to Tier 2 so relocation is a "need" or namely is required. However, as already described, if this page is relocated since the short-cycle IOPS has become high, or in other words if there was a promotion to Tier 1 due to a page movement from monitor rewrite & tier decision processing, and if the short-cycle IOPS value has not dropped (the value for the short-cycle IOPS is larger than the tier allocation threshold value 208A by a specified amount), then the relocation may be "Not needed". If the current tier of the target page was tier 2 then the target page was already migrated to tier 2 so relocation is "Not needed." One method for determining in which tier the target page is currently located can be judged from the pool volume No. 704 based on the relation between the pool volume No. 704 and the logical address 703 of the virtual volume 702 in the dynamic mapping table 501.

If relocation is required then an enqueue is set in the page relocation queue in order to relocate the target page (S1504). If relocating is not required or after the page was relocated, the page relocation program checks whether the next page in the virtual volume is a relocation target page or not (S1502, S1503). After executing relocation processing across the entire virtual volume, the page relocation program checks another non-processed virtual volume for page relocating; and continues checking virtual volumes until there are no more non-processed virtual volume for page relocating (S1501). In the case of cyclical processing, the page relocation program terminates once at the end of the cyclical processing; and the page relocation program continues executing the page relocation processing again for the next cyclical processing. If relocation processing terminates before the end of the cycle, the page relocation processing is terminated once at that point in time, and is then newly executed on each virtual volume in the next cycle.

FIG. 16 is a flowchart expressing the operation of the page relocating processing program. This processing performs relocation in page units and is a multiplexed operation across the entire system. This processing is performed at the time there is a dequeuing of the entry 1103 from the page relocating execution queue 506. This processing is implemented by input of the identifier for virtual page 201, identifier for the movement source physical page and identifier for the movement destination physical page included in the entry described in FIG. 11 during dequeuing of the entry 1103. First of all the page relocating processing program checks the cache management table and decides whether or not there is a area for the virtual page identifier in the cache (S1601). If there is a area for the virtual page identifier in the cache then the processing proceeds to step 1604. If there is no such area on the cache in step 1601 the page relocating processing program procures a cache memory, rewrites the cache management table (S1602), and executes the staging processing on the target data (S1603). This step is for staging the data for the physical page of the movement source on the cache memory.

Switching of page mapping is afterwards performed (S1604). More specifically, the identifier of the physical page matching the virtual page on the dynamic mapping table 501 is rewritten to the identifier of the physical page of the movement destination. In this case, the movement source page is an unused page. The dirty bit for the relevant cache area on the cache management table is afterwards rewritten to ON (S1605) and the processing ends. Setting the dirty bit to ON asynchronously destages data in the physical page of the movement destination by way of the destage processing program 604.

Figure 17:
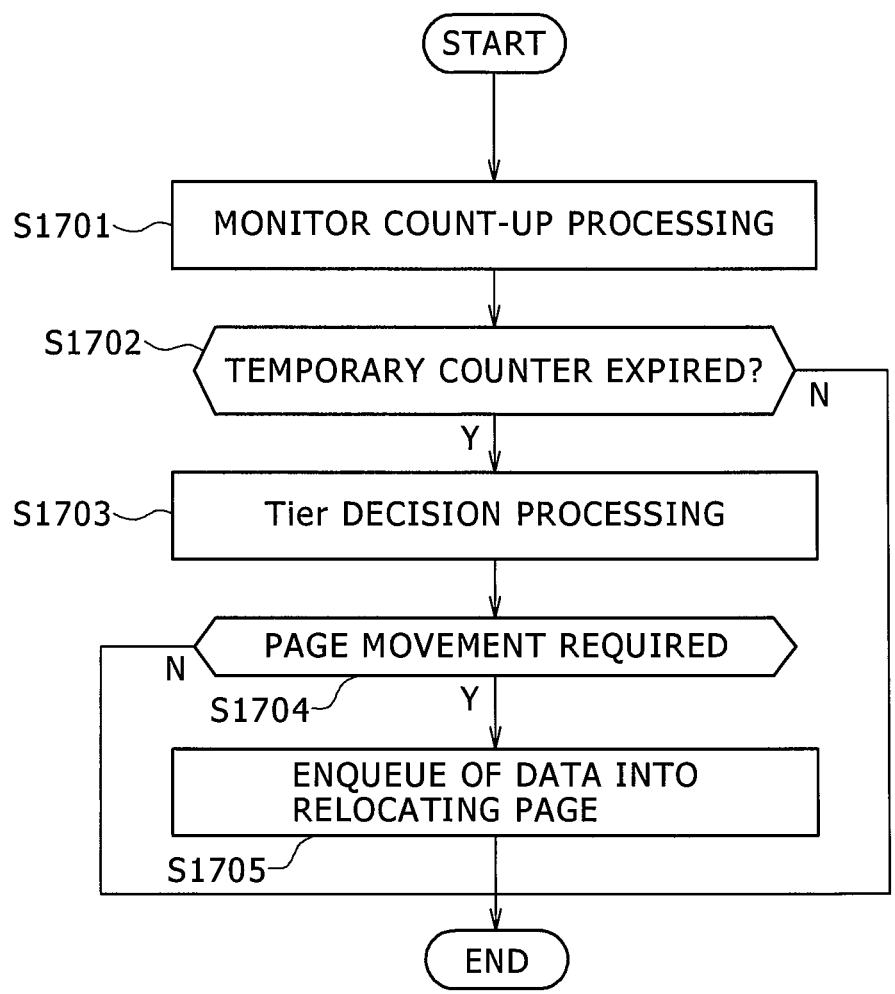
FIG. 17 is a flowchart expressing the operation of the monitor rewrite & tier decision processing.

FIG. 17 is a flowchart expressing the operation of the monitor rewrite & tier decision processing. This processing is executed synchronously with the read command in S1206 of the IO processing program during read, and is asynchronously with the write command by the write program in S1304 during write. Monitor sampling is carried out at the timing that the command is issued to the drive, and is also intended to monitor the portion of cache hits when a host IO is received. In the present invention, the tier decision processing is executed at the time that the monitor is rewritten.

First of all, the monitor count-up processing starts when this (monitor rewriting & tier decision processing) starts up (S1701). More specifically, for entries in the page monitor tables corresponding to the relevant page, the long-cycle IO counter 902 counts up in the sampling phase of the current cycle, and the temporary counter 903 counts up. During the first IO, the current time is stored at the prior temporary counter expiry time. After the monitor count-up, when the temporary counter 903 reaches N, the short-cycle IOPS is calculated from (current time−prior temporary counter expiry time)÷N. The processing afterwards proceeds to the tier decision processing (S1703). If the temporary counter does not reach N or more, then the processing ends. In the method for calculating this short-cycle IOPS, the short cycle relative to a specific cycle will disappear if (current time−prior temporary counter expiry time) exceeds the specified cycle. Therefore, the measurement may be stopped and the count returned to the default value when the (current time−prior temporary counter expiry time) is longer than the specified time. Also, the above described method for calculating the short-cycle IOPS just illustrates one example, and other techniques for measuring the IOPS within an interval shorter than the specified cycle may be employed. For example, the method disclosed in the fourth embodiment can also be employed which estimates the short-cycle load by utilizing the variance.

The tier decision processing (S1703) is made by judging various types of threshold value (tier allocation threshold value 208, promotion threshold value, demotion threshold value) and is described in detail in the second embodiment and third embodiment. If results from the tier decision processing (S1703) are that page movement is required (Y in S1704), the page for relocation is enqueued into the page relocating execution queue 506 (S1705) and the processing ends. If the page movement is not required (N in S1704), the processing then ends with no further changes.

Figure 18:
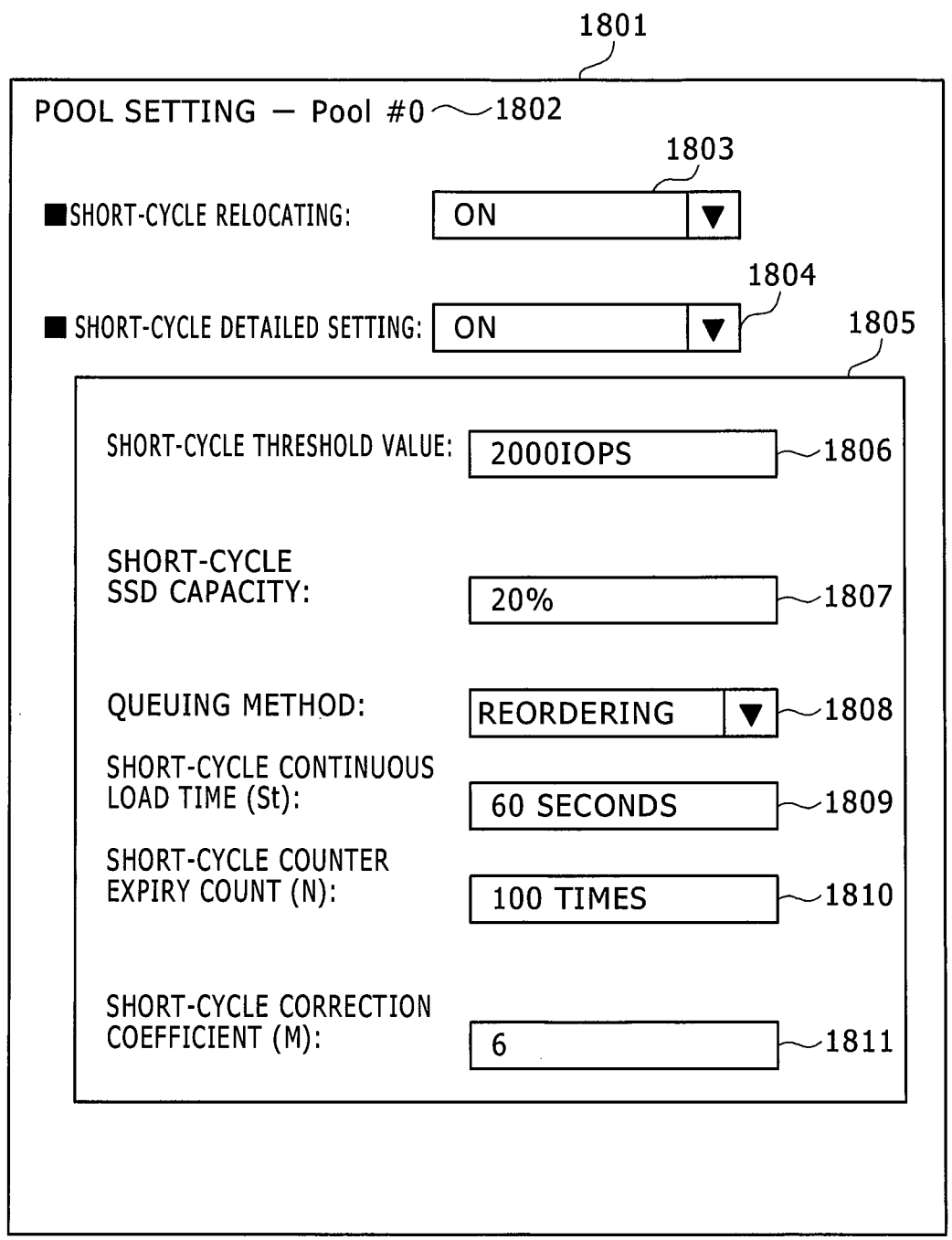
FIG. 18 is a drawing showing examples of the screen for setting parameters in pool units.

FIG. 18 is a drawing showing examples of the screens for setting parameters in pool units. A GUI screen 1801 in pool unit is comprised of a area 1802 for showing pool No. capable of specifying the pool for the target object, the area 1803 for setting the ON/OFF of the short-cycle relocation, and area 1804 for setting the ON/OFF of the detailed setting when short-cycle relocation was selected to ON, and the area 1805 for setting the detailed contents. The information set on this screen is stored in the setting information table 507.

When the setting 1803 for short-cycle relocation was set to OFF, relocation is performed including promotion to Tier 1 in the asynchronous relocating decision processing program 606 without performing decision processing by the short-cycle monitor. More specifically, only the long-cycle monitor count-up is implemented in the monitor rewrite & tier decision processing and the processing from step 1702 onwards is not performed. However when the setting 1803 for short-cycle relocation was set to ON, the operation is performed just as described in the present embodiment.

The short-cycle detailed setting 1804 can be made when the setting 1803 for short-cycle relocation was set to ON, and each item for 1805 can be entered. If the short-cycle detailed setting 1804 was set to OFF, then each parameter operates via the default value or the value automatically calculated within the storage system.

The short-cycle threshold value 1806 is a threshold value utilized for deciding promotion of the page short-cycle IOPS. The short-cycle threshold value 1806 is automatically calculated within the storage system from the tier allocation threshold value 208, etc. A specific example of the calculation method is described in the second, third, and fourth embodiments. A short-cycle SSD capacity 1807 is a setting for specifying the storage capacity of the SSD (Tier 1) utilized in the short-cycle relocation. The target capacity is dynamically set when the short-cycle detailed setting 1804 is set to OFF. A detailed description is disclosed in the third embodiment.

The queuing method 1808 is for specifying the processing sequence of the queue described in FIG. 11. Choices may include "reordering (description in the fourth embodiment) or "first-in first-out (FIFO). Other choices may be set by generally known scheduling algorithms (HOL, LIFO, etc.), and enqueue or dequeue methods in page relocating execution queue 506 may be operated in conformance to those settings. The default method stored in the setting information table 507 (even "reordering" for example is okay) can be utilized when the short-cycle detailed setting 1804 was set to OFF. The continuous short-cycle load time (St) 1809 is an item for setting the parameter for the time the short-cycle load is continuously applied. This continuous time is dependent on patterns or characteristics of the host IO load and so can be set by the user in the present embodiment. When the short-cycle detailed setting 1804 was set to OFF, there are methods for setting the ST utilizing the default value (for example, 1 minute) stored in the setting information table 507 or the value calculated by way of the method described in the fourth embodiment.

The short-cycle counter expiry count (N) 1810 is the expiry value on the counter that calculates the short-cycle IOPS. When the short-cycle detailed setting 1804 was set to ON, the user can set the sensitivity (length of the detection time) relative to a rise in a sudden load, by (the user) specifying this short-cycle counter expiry count. Here, N can be utilized as a default value (for example, 64 times) or as the value calculated by the method described in the fourth embodiment, when the short-cycle detailed setting 1804 is set to OFF.

A short-cycle correction coefficient (M) 1811 is information for setting to what extent to make promotion difficult after comparing the short-cycle IOPS with the long-cycle IOPS. Assuming for example that promotion is set to occur when the long-cycle IOPS is 5 or more, the short-cycle IOPS can be set to execute promotion when at M×5 or more. This value may also be set dynamically such as by a method described later on, and may utilize a default value that was set beforehand, and may also be a value specified by the user on this setting screen.

Among the items in the detailed settings described above, just a portion of the items can be utilized as detailed settings and all other items can be configured so as to be set automatically. Also, the setting values for the detailed settings described above can also be saved under a label such as "preset 1" and may be set easily in the area 1805. Each type of setting item described above was described in pool units in the above example but rather than just pool units, these items can be specified by virtual volume units or physical volume units or page units. In that case, the setting information table 507 holds tables for storing the parameter for each (in virtual volume unit or physical volume unit or page unit) target resource.

One example of the tier decision method is disclosed as the second embodiment.

Figure 19:
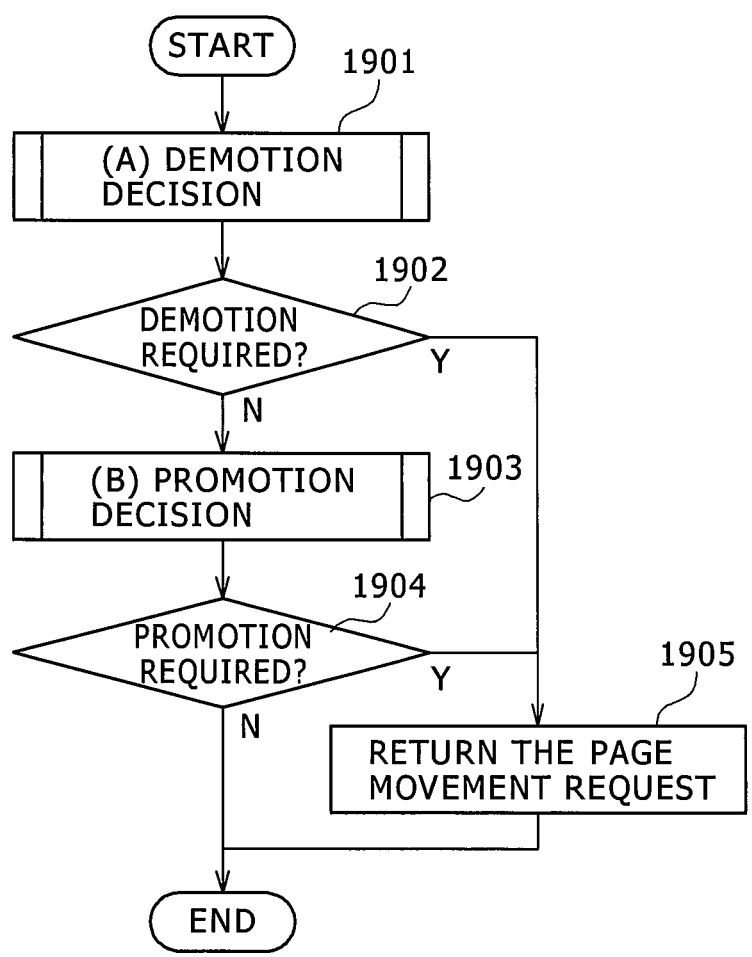
FIG. 19 is a flowchart for expressing the operation for the tier decision processing.

FIG. 19 is a flowchart for expressing the operation in the tier decision processing of the present embodiment executed in S1703 in FIG. 17.

First of all, when this processing starts up, the (A) demotion judgment is executed (S1901). This decision processing decides whether or not to execute demotion processing on the relevant page as the demotion target. The details are described while referring to FIG. 20. If the result of the decision processing is that demotion is required (Y in S1902) then the page movement request is returned (S1905) and the processing ends. If the decision results are that demotion is not needed (N in S1902) then a (B) promotion decision is implemented (S1903). The decision processing decides whether or not the relevant page is a promotion target. The details are described while referring to FIG. 21. When the result is that promotion is required (Y in S1904), the page movement request is returned (S1905) and the processing ends. If decided that promotion is not necessary (N in S1904) then the processing ends unchanged (page movement not needed). As described above, demotion is performed prior to executing promotion in order to obtain empty storage capacity in Tier 1.

Figure 20:
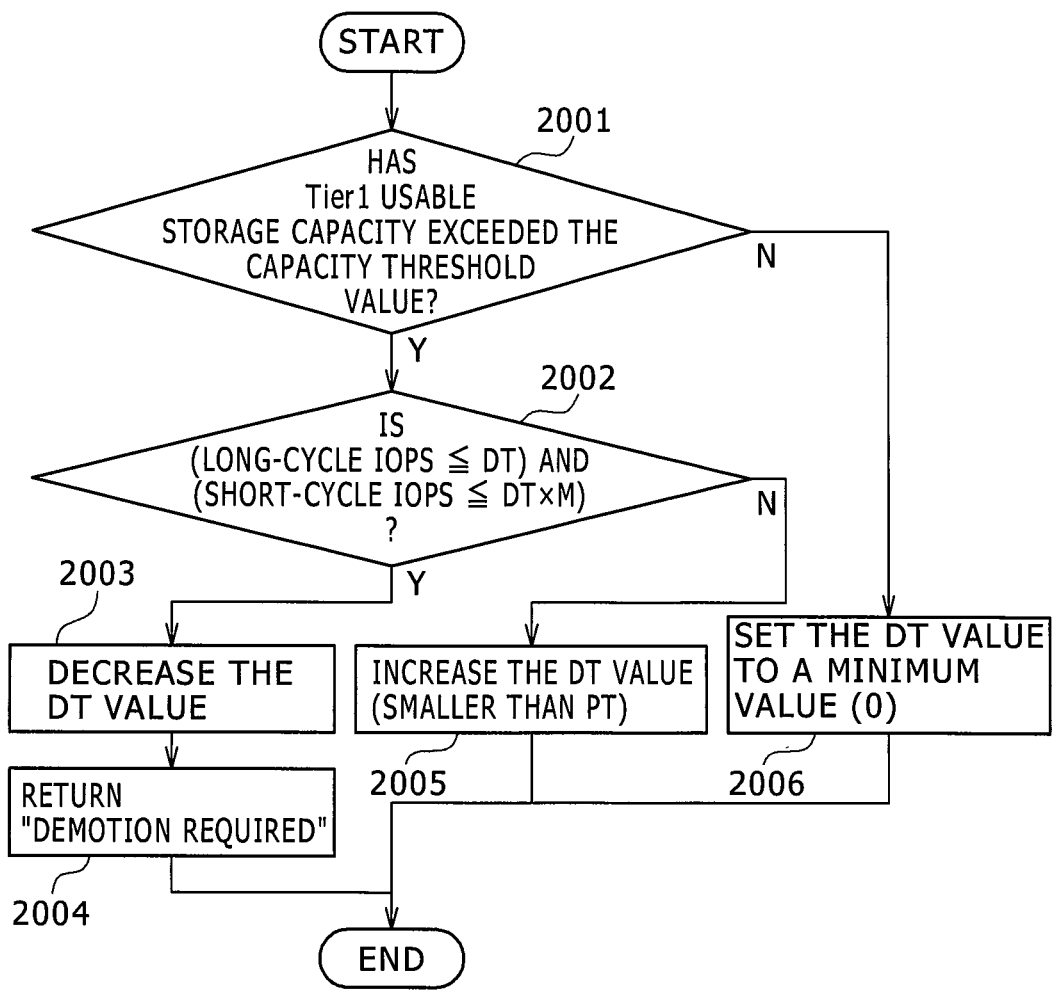
FIG. 20 is a flowchart for expressing the operation of the demotion decision processing.

FIG. 20 is a flowchart for expressing the operation in the demotion decision processing. First of all, the decision processing judges if the usable storage (memory) capacity of the Tier 1 is a specified amount (threshold) or larger (S2001). This step is not essential but including this decision allows executing the demotion in the case of being required in order to obtain empty storage capacity in Tier 1 and shortening the time required for the sudden promotion by securing empty storage capacity in Tier 1 in advance. If the usable storage (memory) capacity does not exceed a specified threshold value (N in S2001) then the processing ends. The demotion threshold value may be reset to a minimum value prior to ending the processing (S2006). The initial value of DT (threshold value for demotion) may for example be set to 0. Along with the usable capacity, a decision on whether the Tier 1 performance operating rate exceeded a specified value can be made in order to determine whether to proceed to S2002 or not. A high performance operating rate will cause deterioration of the Tier 1 response so demoting a portion of the data will allow avoiding the load.

If the usable storage capacity threshold value was exceeded (Y in S2001), then a tier decision for the page is made by way of the demotion threshold value (S2002). More specifically, when the long-cycle IOPS is at the DT or less, and the short-cycle IOPS is DT×M or less (Y in S2002), then the "demotion required" is returned (S2004), and the processing ends. This "M" is a figure larger than 1, and the value stored in the setting information table 507 is used. Compared to the long cycle, a short-cycle IOPS is adjusted so that the more IOPS are required. The reason is that the short-cycle IOPS tends towards a large number of page relocations since the probability of a continuous load is considered low, and the short-cycle IOPS threshold value is raised in order to suppress relocations based on the short-cycle IOPS. The M value may be dynamically adjusted so as to attain an optimum hit rate to the Tier 1 by (utilizing) generally known techniques such as feedback control utilizing the hit rate to the Tier 1 and so on as an evaluation function.

Though not essential, the subsequent DT value can be reduced (S2003). If the DT value is a level, then reduction can be achieved by lowering the level by a fixed value, and if the DT value is IOPS then reduction can be achieved by multiplying by a value smaller than 1 (fixed value) or even by subtracting a fixed value. Lowering the threshold value makes just those pages in the Tier 1 having a lower IOPS a target for demotion in the next flow.

When the decision in S2002 is N, the DT value is increased (S2005) (though not to a figure exceeding PT. If the PT is exceeded, the demotion target has a larger IOPS than the promotion target so the number of IO to the Tier 1 decreases.), and the processing ends.

Therefore as shown above, the DT value can be reduced when there is not enough T1 capacity and there is a page for demotion target; and the DT value can be increased when there is not enough Ti capacity and there is no page for demotion target. The present configuration is capable of executing an appropriate matching demotion to obtain empty space capacity for storing pages needing promotion (namely, demotion of pages with a low IOPS) and setting pages with as low a number of IO as possible as the movement targets via dynamic control of the demotion threshold values.

When the drive load or the number of pages while performing relocation is higher than a specified figure prior to step 2003, the demotion decision processing judges that page movement is impossible, and the processing may be ended without performing step 2004. Relocation can in this way be achieved that takes into account the amount of allowable page movement per unit of time that is fluctuating due to the drive load during that time.

Each parity group may have a demotion threshold value. When the Tier 1 is an SSD, then a step may be added for deciding whether or not maintaining the specified SSD endurance will be difficult or not due to the concentration of writes by the host IO. If maintaining the endurance is difficult, a step for setting pages with high write load to the demotion target is set. In this case, the demotion target is preferably in PG units.

Figure 21:
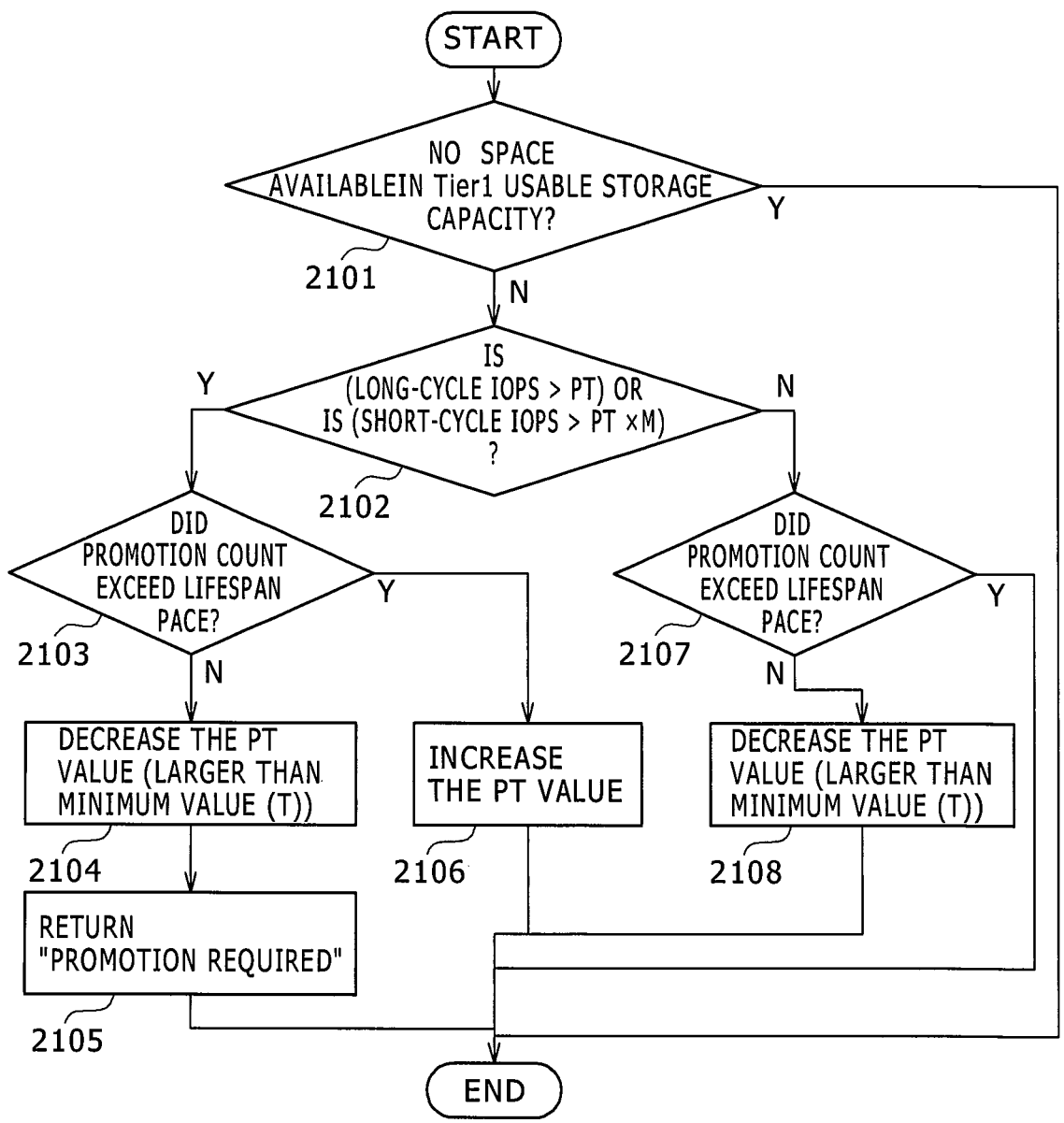
FIG. 21 is a flowchart for expressing the operation of the promotion decision processing.

FIG. 21 is a flowchart for expressing the operation of the promotion decision processing. The promotion decision processing implements dynamic control (increases or decrease the PT) of the promotion threshold value (PT) so that pages with as high a short-cycle IOPS as possible are promoted under restricted conditions (SSD endurance, movement throughput). Here, T for example can be utilized as the initial value of the PT.

First of all, if there is no free (empty) Tier 1 usage capacity (Y in S2101), then page movement to Tier 1 is impossible so the processing ends. If there is free (empty) Tier 1 usage capacity (N in S2101), then the processing judges that the long-cycle IOPS is exceeding the PT or the short-cycle IOPS is exceeding PT×M. This "M" has the same significance as was described in FIG. 20 and an identical structure. A value different from the demotion M may be set.

In the case of Y in S2012, a "promotion required" is returned (S1205) and the processing ends. In the case of N in S2102, the processing ends unchanged. Here, if Tier 1 is an SSD, then a decision on whether the promotion count exceeds the life span base as shown in the flow such as MLC (in particular, MLC with a low limit value on the erase count (S2103, S2107).

Figure 4:
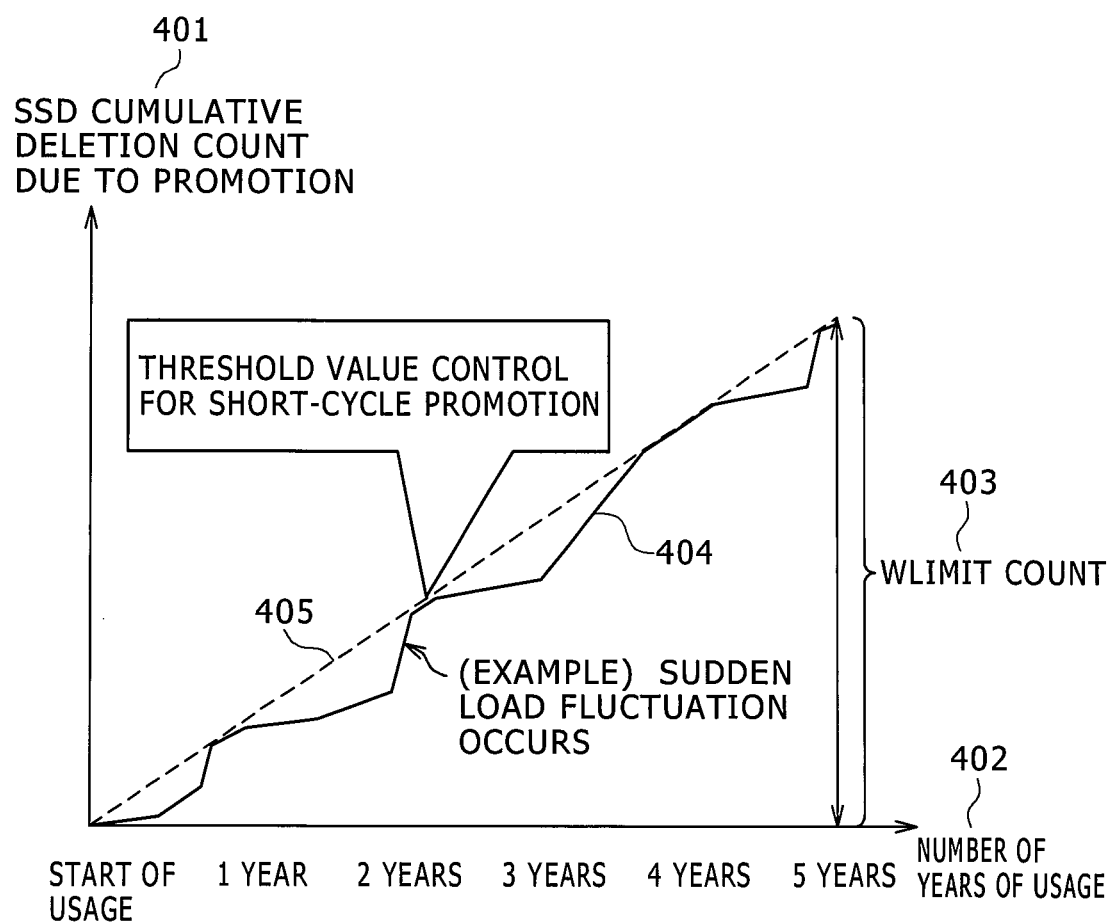
FIG. 4 is a graph showing the approach to maintaining SSD endurance.

The graph shown in FIG. 4 shows the concept of adjusting the promotion speed in order to maintain the SSD endurance. There is a limit on the write count in SSD, and frequent writing will shorten the SSD endurance. Therefore, frequent performing of promotion processing which performs writing on SSD will shorten the SSD endurance (demotion only reads from the SSD so basically does not have this type of problem). The vertical axis 401 in the graph indicates the total SSD erase count due to promotion. The horizontal axis 402 indicates the progress over the number of years the storage system was used. The Wlimit 403 indicates the maximum limit on the SSD erase count due to promotion. The Wlimit 403 for example can set a specified percentage for an SSD erase count limit (typically, approximately 100,000 times for an SLC (Single Level Cell); approximately 10,000 times for an MLC (Multi Level Cell.)) The life time of a storage product is in most cases set for example to approximately five years. The graph 404 shows an example of a change in the erase count due to promotion (during those years). The graph 405 signifies the cumulative value according to the number of usage years for the erase count pace per the target promotions. When the IO suddenly becomes a large figure and the load becomes high, the movement quantity due to promotion also becomes large. Control is therefore applied in this embodiment by raising the short-cycle promotion threshold value so that the erase count does not exceed the pace 405. This configuration allows efficiently narrowing down the movement pages (limiting to higher IOPS pages), and makes a long endurance possible while limiting the SSD erase count due to promotions to a specified range while maintaining the hit rate to the SSD. If there are no sudden loads, the amount of page movement becomes small so surplus erase count can be accumulated. Adjusting the threshold value for the short-cycle promotions for each parity group will prove effective (for maintaining the SSD endurance). Pool units and storage system units may also be utilized.

One method for achieving this type of control is for example to have the storage system retain information on the cumulative promotion count and usage years (Uy) for each parity group. The cumulative erase count due to promotions for the SSD parity group can be calculated from the cumulative promotion count by for example utilizing the following formula.

Cumulative erase count in SSD parity group due to promotions (Wc)=(parity group promotion count×page size/SSD parity group capacity)×correction coefficient (Set according to the RAID level or SSD characteristics (Write Amplification or page size within SSD, etc.))

A judgment on the S2103, S2107 pace can be implemented for example by the following formula, from the Wc that was calculated above.

$$(W\text{limit} \div \text{target number of usage years (e.g.: 5 years)}) \geq (Wc \div Uy)?$$

A true result for the above formula allows judging that the life span pace can be maintained even if promotions are executed. A false result for the above formula allows judging that the life span (endurance) pace will be exceeded when promotions are implemented. The required information (cumulative promotion count, usage years) or information analogous to that information (amount of writes, endurance rates, page size, write amplification efficiency, etc.) may be obtained from the SSD device by SCSI command and so on, and the information may be stored in the local memory 118 or the shared memory 111.

The pace judgment may also be changed dynamically according to the SSD usage capacity rate. In the initial stage of system operation for example, the SSD usage capacity rate is low, and the SSD hit rate is low. However, this type of state (state where vast quantity of page movements are required) occurs often only at one period of the initial stage of the system so that allowing the pace to be temporarily exceeded sometimes proves more efficient. In other words, if the SSD usage capacity rate is lower than the specified value, then all promotions can be performed without implementing the decision in S2103, and temporary (until the SSD usage capacity rate reaches a specified figure or higher) increases in the write quantity allowed; and by reducing the overall write quantity in a subsequent phase the overall performance can be improved. The page movement speed can also be adjusted in stages to match the target pace in each stage.

If the promotion count exceeds the endurance pace then the PT value can be increased (S2106) and if not exceeding the endurance pace then the PT value can be reduced (S2104, S2108). In regards to increasing the PT value (However, do not set the value below the tier allocation threshold value 208A (T)) FIG. 21 shows an example of a flow implemented based only on the decision in S2103. If the PT value is in levels, then increasing the PT value can be achieved by lowering the fixed quantity of the level, and if the PT value is IOPS this increase the PT value can be achieved by multiplying by a value (fixed value) smaller than 1 or even by subtracting a fixed value. The above allows setting pages with as high a number of IO as possible as the movement target while satisfying the pace of erase counts (Wlimit) from a limited number of promotions.

Also, if the page relocation execution queue has been embedded or the drive load is high then the PT value can be increased, or in the reverse case then the PT value can be decreased. The current processing is capable of setting pages with as high a number of IO as possible as movement targets while maintaining a balance between the page movement quantity and a limited amount of time units.

A promotion threshold value may also be set for each parity group. If retained in parity group units, a endurance judgment can be made via parity group units and page movement completed while reduced to a minimum number of pages. Moreover, items such as the read and write ratio and the sequential ratio per page can be utilized to make a setting so that no promotion of pages with a write quantity higher than a specific position (large write ratio, high sequential ratio) is performed.

In the above embodiment the endurance pace was judged using writing via promotions however the endurance judgment may also including writing by the host IO. If for example there are IO patterns where there is little writing by the host IO, then a relative increase can be made in the number of promotions and the Tier 1 hit rate can be improved.

An example of another tier decision method is disclosed next as the third embodiment. The present embodiment differs from the third embodiment in that the short-cycle load is assumed to continue for a specified period (St) and the page relocated in the short cycle is fixed (achieved by a fix or clamp mark on each page) for a specified period (St) in the tier at the relocation destination. Moreover, the short-cycle promotion quantity can be restricted to a fixed quantity in order to strictly control the short-cycle IOPS promotion quantity in the demotion quantity management table 2201. Also, load quantities excessive to the long cycle can be minimized according to the short-cycle promotion quantity.

FIG. 22 is a drawing showing the structure of the demotion quantity management table and the table structure of the monitor table for each extension page (1). The demotion quantity management table 2201 is the same as the pool frequency distribution in the point of having entries for a number of pages 2203 that vary according to each load level 2202 from the long-cycle IOPS. The structure in FIG. 22 further has a scheduled demotion count 2204 for each load level 2202, and a demotion count 2205. The tier allocation threshold value 208A (=T) is already calculated at the time of the frequency distribution calculation process. The scheduled demotion count 2204 is equivalent to the number of pages for each load level for demotion that corresponds to the short cycle promotion. Therefore, the scheduled demotion count 2204 is added during the short-cycle promotion decision, and is subtracted when the page load has decreased after performing the short-cycle promotion. The demotion count 2205 on the other hand, expresses the page for each load level where demotion was actually performed. Therefore, this count is added when performing demotion of the page targeted for substitution (page with long-cycle load that is as low as possible) and during subtraction of the scheduled demotion count 2204 whose short-cycle promotion load has lowered; this count is subtracted when promoting a page that was fixed at a lower-ranking tier, and returning to the original state. The present embodiment controls the demotion count or demotion threshold value in order to account for the number of pages required to promote a page whose IO count was increased in the short cycle, by managing the scheduled demotion count and demotion count.

In order to demote a page with as low a load as possible in the long cycle, the scheduled demotion count 2204 is added in order from pages (equivalent to LV2 in this drawing) with a load level equivalent to the long-cycle threshold within a range that does not exceed the number of pages 2203. Which in that case results in: scheduled demotion count>demotion threshold value 2206 whose minimum load level serves as the demotion count (=Dt).

The above described demotion quantity management table 2201 may be included in each pool VOL or each PG in order to set a demotion threshold value in each pool VOL or each PG. In this case, during execution of the frequency distribution generating program in FIG. 14 the frequency distribution for each pool VOL or each PG is generated, and based on that information, a number of pages 2203 can be calculated for each load level 2202.

The monitor table for extension page (1) 2207 is a table that is an extension of the columns in the page monitor table 502, and the monitor information index No. 901 is identical to the structure of the page monitor table. When ON, the short-cycle relocating page clamp mark 2208 shows the state where the page is clamped to the current tier. The short-cycle promotion execution time 2209 stores the execution time in the case where the relevant page was promoted in a short cycle. This information can be utilized to prevent a short-cycle promoted page from being judged for demotion within a fixed period (St). Demoted pages with small long-cycle loads targeted for temporary substitution can also be prevented from being judged for promotion by setting the mark to ON.

Figure 23:
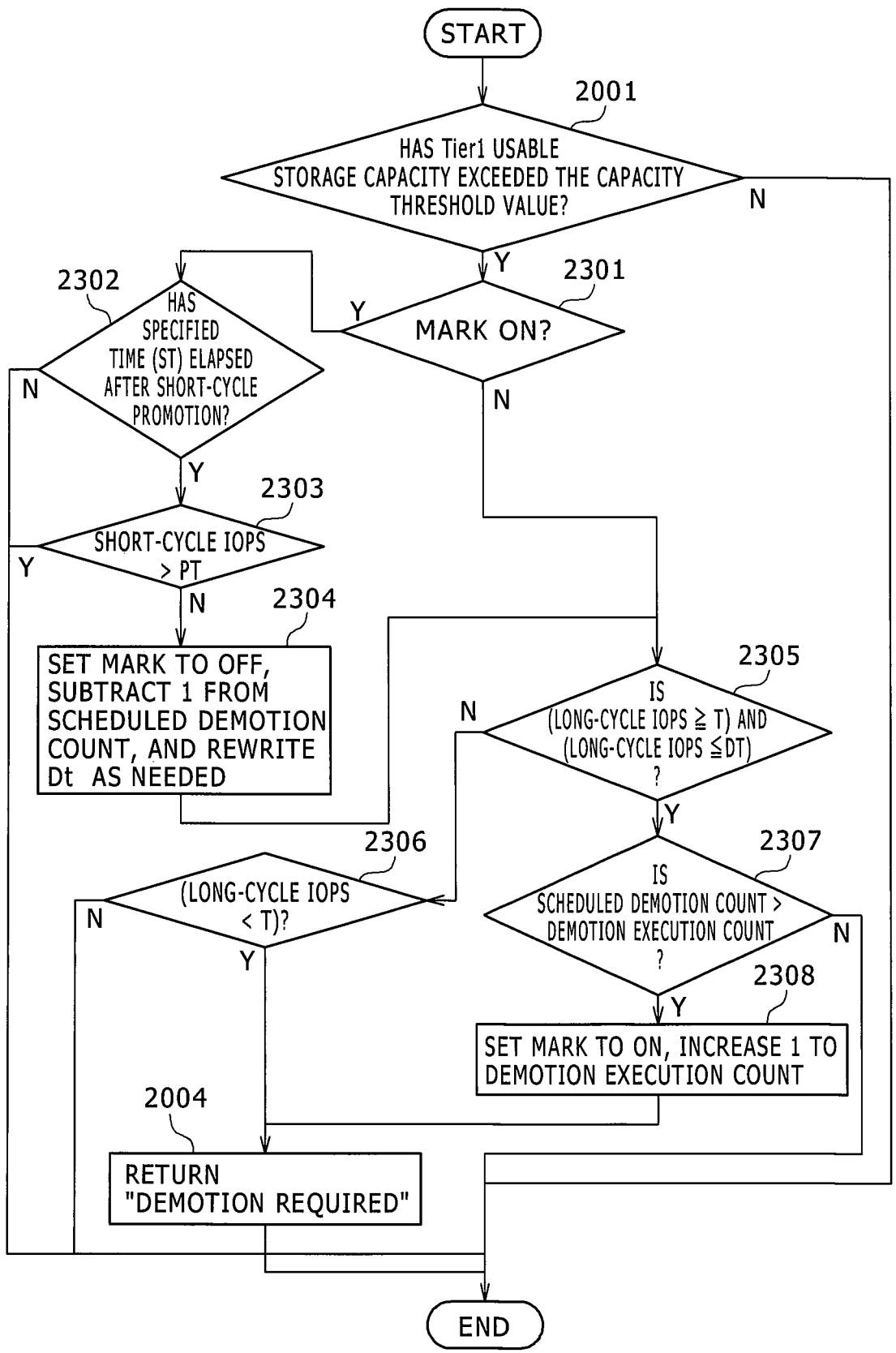
FIG. 23 is a flowchart for expressing the operation of the demotion decision processing.

FIG. 23 is a flowchart for expressing the operation of the demotion decision processing (2). The demotion decision processing is equivalent to the (A) demotion judgment (S1901) in the tier decision processing in FIG. 19. This description only covers those points differing from the demotion decision process flow described in FIG. 20.

In step 2301, the demotion decision processing checks the short-cycle relocating page clamp mark 2208 in the entry for the monitor table for extension page (1) 2207 corresponding to the relevant page, and decides whether or not the mark is ON for the relevant page. If the mark is ON (Y in S2301), the demotion decision processing decides if the condition (current time−short-cycle promotion execution time)>St is established (S2302). Here, St is a specified value that is set in advance. If not established, (N in S2302), the processing ends. If established, (Y in S2302), the demotion decision processing decides that the short-cycle IOPS>PT (S2303). If established (N in S2303) then the relevant page is still in a high load state so there is no need for demotion and the processing ends unchanged. If not established (N in S2303), the mark is set to OFF, the scheduled demotion count is decreased by 1 (specified value), the DT is rewritten as needed (S2304), and the processing proceeds to step 2305. The DT is rewritten so that the minimum load level where the scheduled demotion count>the demotion count, serves as the demotion threshold value 2206 (=Dt).

The demotion decision processing afterwards decides whether or not the condition: long-cycle IOPS≥T and also long-cycle IOPS≤DT is established (S2305). An established condition signifies that the target page for demotion is the target for substitution when executing a short-cycle promotion. If the condition is established (Y in S2305), then the demotion decision processing decides whether or not the condition scheduled demotion count 2204>demotion count is established for the long-cycle load level of the relevant page (S2307). When demotion is needed with these conditions established (Y in S2307), the mark for the relevant page is set to ON, the demotion count is increased by one (S2308), a "demotion required" is returned (S2204) and the processing ends. If these conditions are not established (N in S2307) the processing ends.

When an N (no) in S2305, the demotion decision processing decides whether or not the condition of a long-cycle IOPS<T is established (S2306). If this condition is established, then the long-cycle load is low in the first place and so basically should be located to Tier 2. The demotion request is therefore returned (S2204) and the processing ends.

Figure 24:
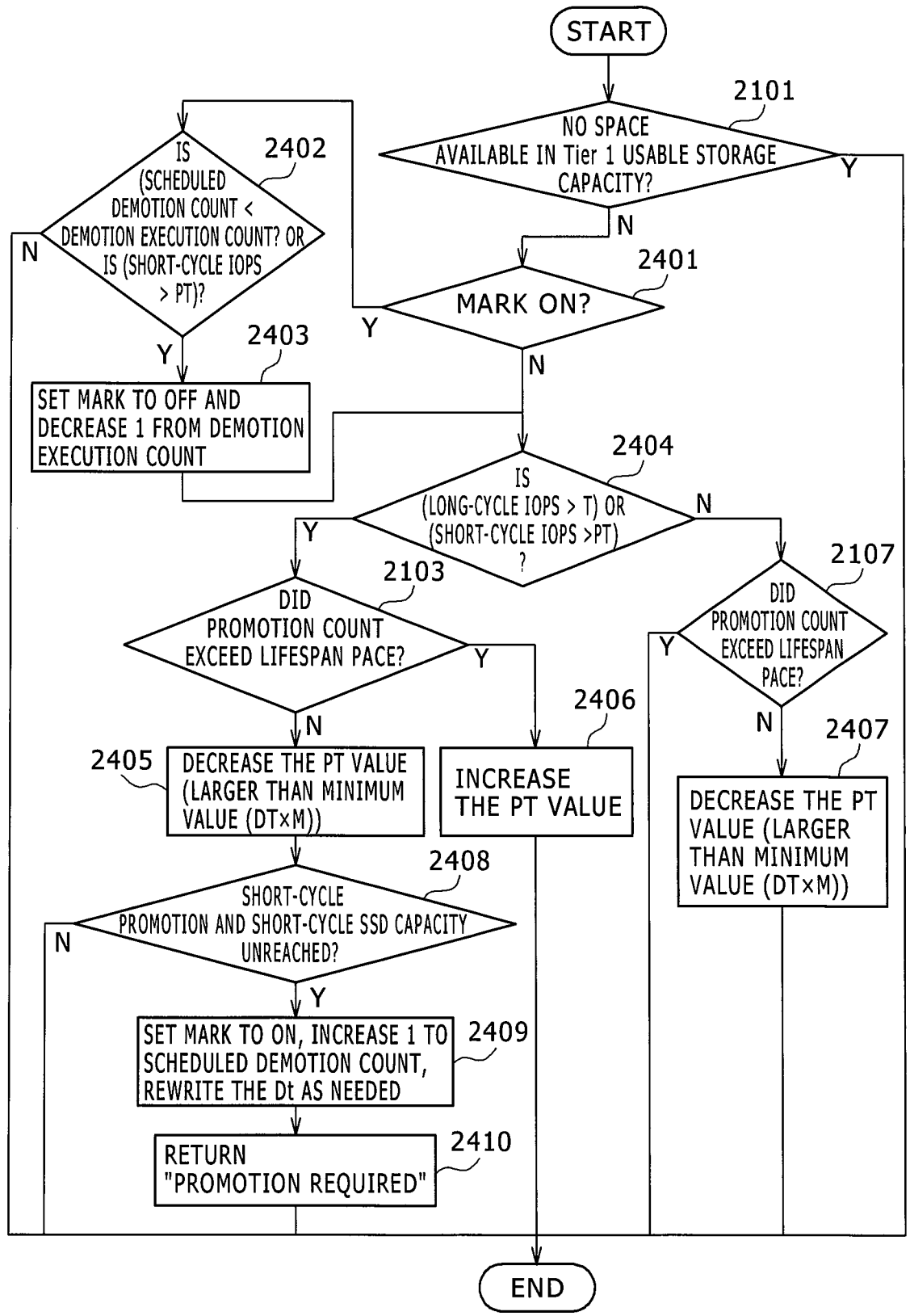
FIG. 24 is a flowchart for expressing the operation of the promotion decision processing.

FIG. 24 is a flowchart for expressing the operation of the promotion decision processing (2). This processing is equivalent to the (B) promotion decision (S1903) in the tier decision processing in FIG. 19. This description covers only those points differing from the promotion decision process flow described in FIG. 21.

Step 2401 is identical to the step 2301. If the mark is ON (Y in S2401) then the processing proceeds to step 2402. In step 2402, the promotion decision processing decides whether or not the condition (scheduled demotion count<demotion count) or (short-cycle IOPS>PT) is established. The condition decision (scheduled demotion count<demotion count) is established when the load on the short-cycle promoted page is low in the demotion decision. The condition decision (short-cycle IOPS>PT) is equivalent to the case in which the short-cycle load has suddenly risen for a page where demotion was implemented for temporary interchanging for a short-cycle promotion. If N in step 2402 the processing ends. If Y in step 2402 then the mark for the relevant page is set to OFF, and 1 is subtracted from the demotion count (S2403), and the processing afterwards proceeds to step 2404.

In step 2404, the condition (long-cycle IOPS>T) or (short-cycle IOPS>PT) is established and the promotion decision processing decides whether promotion is required or not. When a Y (yes) in step 2404, a check is made whether or not the relevant page is for a short-cycle promotion and also short-cycle SSD capacity is reached or not (step 2408). During the judgment in step 2404, if the condition (long-cycle IOPS>T) is not established, and the condition (short-cycle IOPS>T) is established, the relevant page can be judged for short-cycle promotion. The promotion decision processing calculates the information stored in the setting information table 507 that was set by way of the setting items 1807 on the GUI 1801, and the page count that may be utilized in the short-cycle promotion from the overall Tier 1 capacity, and compares it with the cumulative value of the scheduled demotion count 2204 for each load level 2202 in the demotion quantity management table 2201, and if that cumulative value does not exceed the number of pages usable in the short-cycle promotion, decides that the short-cycle SSD capacity still has not been reached.

If the decision in step 2408 is N, the processing is ended. If the decision in step 2408 is Y, the mark of the relevant page is set to ON, the scheduled demotion count for the load level associated with the relevant page of demotion quantity management table 2201 is increased by 1, and the DT is rewritten as needed (step 2409). The DT is rewritten so that the minimum load level that is scheduled demotion count>demotion count, serves as the demotion threshold value 2206 (=Dt). A "demotion required" is afterwards returned (S2204), and the processing ends. If the decision in step 2404 is N, the processing is ended.

An expansion plan for this processing is possible that is the same method as shown in FIG. 21. For example, if the Tier 1 is an SSD (especially for MLC with a low erase count limit), a decision whether or not the promotion count exceeds the endurance pace (S2103, S2107) may be made. If the promotion count exceeded the endurance pace, the PT value is increased (S2406), and if the promotion count is not exceeded, the PT value is decreased (S2405, S2407) (however, the value is set so as not to exceed DT×M). In this way, pages with a high a number of IO as possible can be set as movement targets, while satisfying the pace for the erase count (Wlimit) due to a limited amount of promotions.

The fourth embodiment is described next. The fourth embodiment is a technique for automatic adjustment of each parameter and estimating the short-cycle load in the methods described in the first through the third embodiments.

Figure 25:
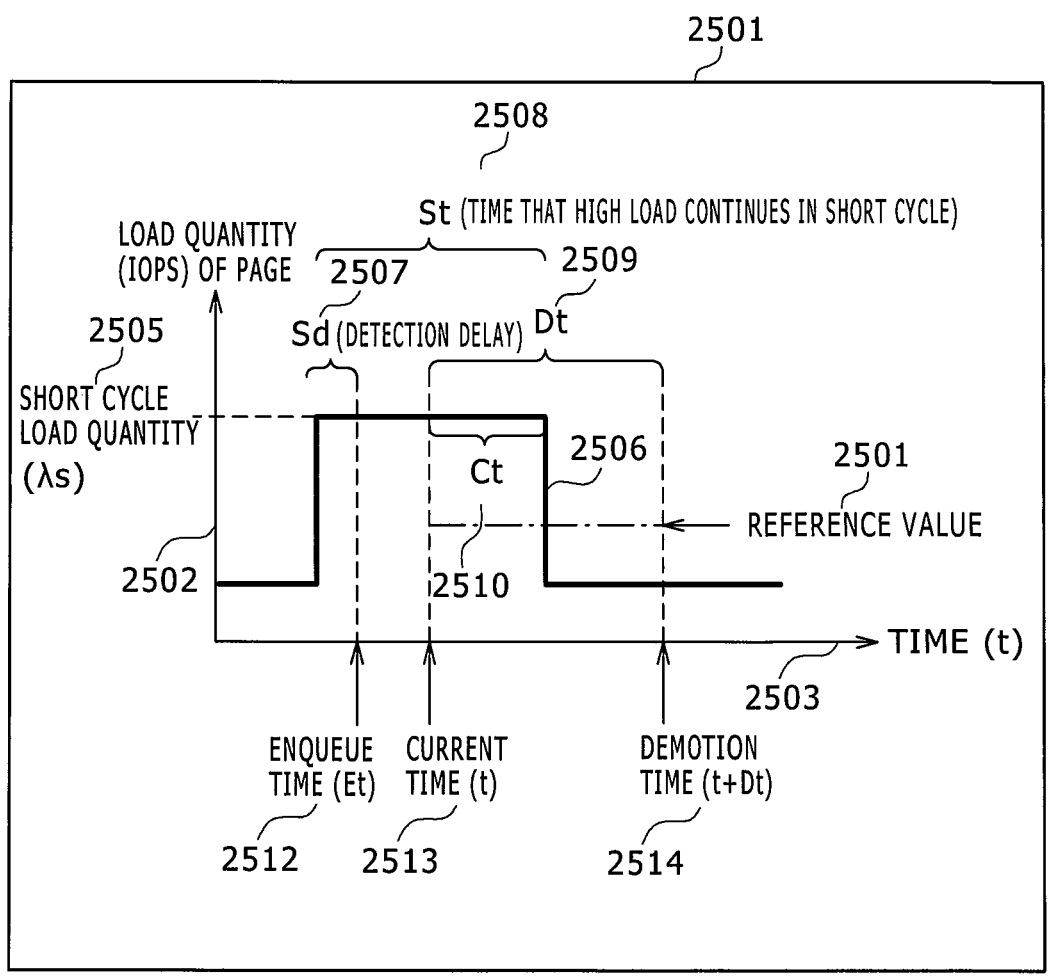
FIG. 25 is a drawing showing the approach towards streamlining the processing.

FIG. 25 is a drawing showing the concept for streamlining the processing. The reference numeral 2501 in the figure shows the significance of each type of parameter in a graph where the load of a certain page fluctuates. The vertical axis 2502 in the graph shows the load (IOPS) in time units on the page. The horizontal axis shows the elapsed time 2503. The graph 2506 shows fluctuations in the elapsed time for the load of a certain page. On the current page, the time from the rise to the drop of the short-cycle load is St (2508). The time from the rise of the load, and tier decision, to enqueuing in the page relocation queue is Sd (2507). This time is called the detection delay time. The detection delay time is set by the short-cycle load (IOPS) value per unit of time and the value of N (Sd=temporary counter expiry value (=N)÷short-cycle IOPS). Relocation might not be promptly performed even if data is enqueued into the page relocation queue in the enqueue time (Et) (2512), due to reasons such as that the page relocation tasks are currently in progress (no page relocation task availability), etc. The time (current time) assigned to the next relocation processing (task) for executing relocation is set as t (2513). The period from the promotion of a page through the subsequent demotion (2514) is set as Dt. Moreover, demotion cannot start promptly after promotion of a page due to movement of other pages (promotion or demotion) for the same reasons as above. The Dt value is utilized to take these effects into account. Taking these effects into account allows setting the average load in the period from page promotion to demotion (Dt2509) as a reference value (2511) when the relevant page was relocated (in a short cycle). Selecting a page where this reference value is high allows efficiently raising the Tier 1 hit rate.

FIG. 27 is a drawing showing an example of the management table for each parameter. The monitor table for extension page (2) 2701 is a table that is an extension of the columns in the page monitor table 502, and the monitor information index No. 901 is identical to the structure of the page monitor table. The monitor table for extension page (2) 2701 includes at least one from among any columns (fields) of a continuous short-cycle load time (St) (2702), a counter expiry value (N) (2703), and a cumulative value of squares of period where IO occurs (2704, 2705). In the present embodiment for example, in each cycle, two fields (columns) 2704, 2705 are provided for managing the data during sampling, and data secured in the prior cycle.

At the time of monitor count-up processing in S1701, the cumulative value of squares of period where IO occurs 2704 (during sampling) which is a squared value of the difference (=IO occurrence period) between the prior IO occurrence time and the current time, is added to the relevant counter. When N is 2 or more, a method may be utilized to calculate the cumulative value of squares of period where IO occurs, where an N times portion of the IO is assumed to occur at uniform time intervals, at the time of the temporary counter expiry 51702.

The technique for estimating each type of parameter is described next, from the information in the above description.

<Method for Estimating the St>

Assuming as a precondition that the time the short-cycle load continues tends to be a fixed characteristic on each page (continuous short-cycle load pattern characteristic), the continuous short-cycle load time (St) (2702) is recorded at a certain timing, and that value is established as the St value.

To attain even higher accuracy, the continuous short-cycle load time is retained as plural elements per each page, and the continuous load time may be predicted based on information from the past history (record) by utilizing a generally known prediction method (such as the linear approximation method, etc.). Also, whether or not the above assumption (continuous short-cycle load pattern characteristic) was satisfied can be decided as needed from the page monitor information to also select whether or not to execute short-cycle relocation utilizing the present estimation method.

<Method for Estimating the Short-Cycle Load Utilizing the Variance Value>

The above described St was based on the assumption that the St is a fixed value on each page but is not actually fixed in the IO or in other words there are sometimes variations. In the following description of a method for estimating the short-cycle load, the pages can still be efficiently located even when such variations occur. The squared average value (E (f^2)) of the IO occurrence period and the average value (E (f)=IO count 902 cycle time) for the IO occurrence period sampled long-term type (and also in cycles) as a precondition are assumed equivalent in all subsequent cycles (continuous long-term load pattern).

Pages with many sudden loads have a property called (V (f)=E (f^2)−E (f)^2) in which the variance value V (f) of the IO occurrence period becomes large. A further characteristic is that even on pages having the same average value E (f), the larger the variance value V (f), the higher the probability that a large number of IO will be received during the fixed period Qt. Also, when V (f) and E (f) are set to a fixed value, the property is that the longer the Qt, the more the expectation value of the incoming IO count (average value for number of IO received in the period Qt) will approach Qt/E (f) (matching the load for the long cycle).

The technique for predicting the short cycle (Qt) load is described hereafter based on the above characteristics. First of all, a time interval (Qt) is assumed for locating the page in Tier 1 in a short-cycle promotion. The expectation value for the incoming IO count in the short-cycle St (=Qt) is calculated from the Qt and V (f) and E (f), and the short-cycle load (IOPS) (λs2505) are calculated. The expectation value for the incoming IO count can for example be calculated from the approximation formula (expectation value for incoming IO count=(Qt+((V(f)/(E (f)^2))/2)/E (f). Other formula using all or a portion of Qt and V (f) and E (f) as parameters based on the generally known probabilistic theory may also be utilized.

As shown above, pages can be efficiently located (placed) even if there are variations in the properties, by having the storage device retain information on the squared average value (E (f^2)) for the IO occurrence period, and predicting the load of the short cycle (Qt) based on the characteristic of the variance value V (f) within the IO occurrence period. Moreover, the effect is rendered that the memory utilization efficiency is good since there is no need to retain history (record) information on the load for each cycle.

The accuracy when calculating the short-cycle load can also be enhanced by utilizing the IO count 902 during sampling and the cumulative value of squares of period where IO occurs 2704 during sampling. A predicted value for the value from the current to end of the current cycle can be obtained by subtracting the count value sampled up to now from the prior cycle count value, based on the characteristic of the continuous long-term load pattern. By therefore utilizing this method to calculate V (f) and E (f) with this deducted value, the accuracy of the estimate can be improved by estimating the short-cycle load.

The Qt assumed for this estimate, can also be a value calculated from the page quantity (calculated from surplus operation rate of drive or endurance) capable of movement. In other words, if the movable page quantity is small the Qt becomes long, and if the movable page quantity is large, the Qt becomes short. The execution cycle for the asynchronous demotion (for example, 30 seconds) may also be assumed as the Qt. In other words, a tier decision synchronous with the IO cannot be made if there are no incoming IO so that longest time required until collection (=cycle for executing asynchronous demotion) can be utilized as the Qt.

A decision on whether or not the above assumption (continuous long-term load pattern) is satisfied can be made from the page monitor information, and a selection may be then made on whether or not to execute short-cycle relocation using this estimation method.

<Estimation Method for N>

The number of short-cycle IO can be calculated from the above described continuous time St for the short-cycle load, and the short-cycle load $\lambda s$. If the number of short-cycle IO is not larger than N by a specified amount, the difference between Sd and St described in FIG. 25 shrinks so that obtaining the Tier 1 hit rate improvement is difficult even the page is promoted. However, making the N too small, might cause the short-cycle load accuracy to deteriorate so that in view of this tradeoff, the N may be adjusted to an optimal value (N value is stored in 2703). More specifically, methods such as setting a value multiplying the number of short-cycle IO by a fixed coefficient as the N may be considered.

Also, making the N smaller generally causes an increase in frequency judged as requiring page movement, and making the N larger lowers the frequency judged as requiring page movement. The N may therefore be calculated from the amount of movable pages (calculated from surplus operation rate of drive or endurance).

Also, in the case that low performance HDDs are used as tier2, it is efficient to read in a mass (this unit is "page" as described previously) when data copy. Especially when the host I/O spatial locality in a promoting page is high, efficient data copy with high access hit ratio is achieved. Degree of this effect is determined by the trade-off of data copy overhead and hit ratio improvement. For example, the N may therefore be calculated by the formula: N=T_r (=sum of I/O execution time to copy data for promoting a page)/T_h (=average time for executing one I/O of the host). Also, the N preferred to be changed based on a performance characteristics of belonging tier (drive type, average seek time, rotate number, etc) of the promotion page. Also, it is preferred to decide the promotion necessity or data size of the promotion by page monitoring information described previously, but also by some learning information of spatial locality characteristics of each storage area.

Also, the above described promotion method based on its short time access frequency based on N may be adopted for cache memory. In general, data in a range requested by host I/O command is staged to a cache from a storage drive. But in our methods, a mass of data (for example in a page unit) is staged according to its access frequency. It is also desirable to efficiently use the cache area by selectively storing the data which is to be accessed again. Therefore, staging predetermined amount of data unit will be provide higher cache hit ratio in some case, same as page promotion. In case that a predetermined data unit size for staging is smaller than a page size, it will be preferable to set the size N lower than that for the page, because staging overhead is smaller than page relocation overhead (the new N may be determined according to the method described previously). Of course this cache staging method can be applied to our system at the same time with our promotion and demotion method among tiers explained previously.

Each type of the above described estimation methods may be combined, and also just a portion of the method may be utilized. Also each type of the above described estimation methods may be calculated or may contain parameters by pool or pool VO, or PG rather than by page.

Figure 26:
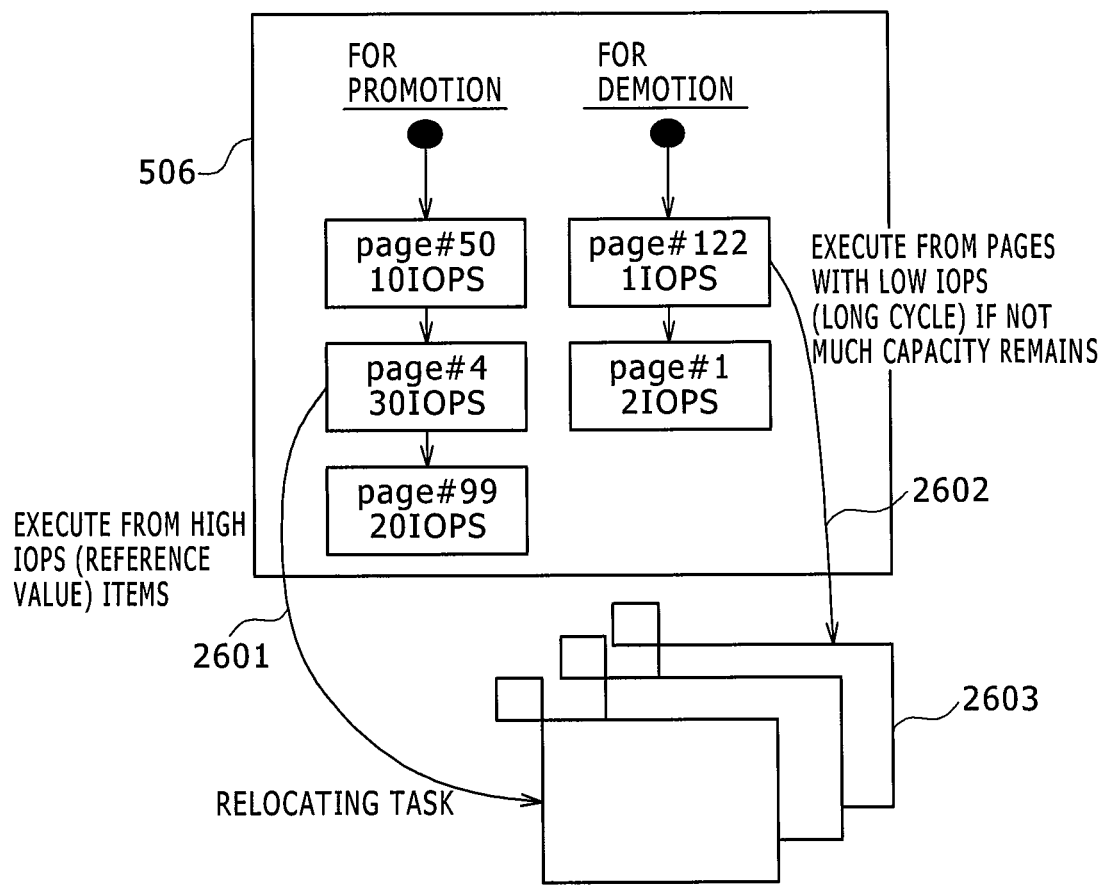
FIG. 26 is a drawing showing the operation for reordering the queue.

FIG. 26 is a diagram showing the queue reordering operation.

In the present embodiment, entries enqueued into the page relocating execution queue (506) are allocated with priority given to the relocation task 2603 by way of the reference value 2511 as described in FIG. 25. In the case of a promotion queue for example, the queue with a high reference value is allocated preferentially to relocation tasks, and in the case of a demotion queue, the queue with a low reference value is allocated preferentially to relocation tasks. This configuration allows more efficiently relocating data among tiers.

More specifically, the above described reference value 2511 may also be calculated by way of the following formula.

$$\text{Reference value (IOPS)} = (Ct \times \lambda s + (Dt-Ct) \times \lambda 1)/St - \alpha$$

The $\alpha$ is a penalty section to expel long cycle, low load pages. Here, $\alpha$ may be a constant but may be dynamically set from demotion thresholds (DT), etc. Also, Ct 2510 is the time from the current time until the rise in the short cycle load settles down (Ct=St−Sd−(t−Et)).

The Dt can more specifically be calculated from the following formula.

$$Dt = Sr \times \text{demotion queue length} + Sr/2 + Ct$$

The Sr expresses the average processing time for the demotion processing. The Sr may be shortened according to the multiplicity (throughput) of the relocating task 2603. The formula may also be changed based on other generally known queuing theories.

Queues for which a specified period has elapsed after an enqueued time Et may be given execution priority while ignoring the reference value. If the number of queue entries has reached a pre-established upper limit, the entries may be deleted from the queue in the order of small reference value, to produce available queue space.

The present invention is not limited to the above described embodiments and all manner of additions and changes within the scope and spirit of the present invention rendered by one skilled in the art are permissible.

What is claimed is:

1. A system comprising:
a processor;
a plurality of first storage media providing a first tier; and
a plurality of second storage media providing a second tier,
wherein the processor is programmed to:
provide a virtual volume whose data is stored in a plurality of tiers including the first tier and the second tier according to a first threshold value based on whether an access frequency of stored data in a predetermined period is higher than the first threshold value;

migrate first data stored in the second tier to the first tier in a case where an access frequency of the first data in the predetermined period is higher than the first threshold value;

migrate second data stored in the first tier to the second tier in a case where a usable capacity of the first tier is less than a predetermined value and a performance operating rate of the first tier exceeds a specific value;

measure a plurality of continuous short-cycle load times of the second data;

estimate a continuous short-cycle load pattern of the second data based on the previously measured plurality of continuous short-cycle load times of the second data; and migrate the second data stored in the first tier to the second tier if the estimated continuous short-cycle load pattern of the second data satisfies a predetermined condition.

2. The system according to claim 1:
wherein an amount of the first data to be migrated from the second tier to the first tier is controlled at least based on a service life of the first storage media, and
wherein the first threshold value increases according to a decrease in the service life of the first storage.

3. The system according to claim 2:
wherein the amount of data to be migrated from the second tier to the first tier is controlled at least based on a cumulative number of data which is migrated to the first tier and a number of years of usage of the first storage media.

4. The system according to claim 3:
wherein the amount of data to be migrated from the second tier to the first tier is controlled at least based on a usage capacity rate of the first storage.

5. The system according to claim 1:
wherein the processor is programmed to migrate the first data stored in the second tier to the first tier in a case where an access frequency of the first data in a period shorter than the predetermined period is higher than a second threshold value.

6. The system according to claim 5:
wherein the second threshold value is higher than the first threshold value.

7. The system according to claim 1:
wherein the processor is programmed to migrate second data, having an access frequency which is lower than the access frequency of the first data stored in the first tier, to the second tier.

8. The system according to claim 1:
wherein the first data is determined to be migrated during processing of a received I/O request to the first data.

9. The system according to claim 1:
wherein the virtual volume includes a plurality of virtual pages, and
wherein the access frequency of data in the predetermined period of a cycle is a number of I/O requests to the virtual page to which a storage area storing the data is allocated.

10. The system according to claim 1:
wherein the access frequency of the first data is obtained by referring to a period in which a predetermined number of accesses have occurred to the first data.

11. The system according to claim 1:
wherein the processor is further programmed to:
migrate a second data stored in the first tier to the second tier, although the first data stored in the second tier is migrated to the first tier,
wherein the second data is selected based on an access frequency of the second data in the predetermined period of the cycle and in a shorter period than the predetermined period.

12. The system according to claim 11:
wherein the second data is migrated to the second tier when a free capacity of the first tier is less than a second predetermined value.

13. The system according to claim 1, wherein the processor is further programmed to:
migrate second data stored in the first tier to the second tier in a case where an access frequency of the second data in the predetermined period is lower than a third threshold value, where the third threshold value is lower than the first threshold value; and
increase the third threshold value in a case where the usable capacity of the first tier is less than the predetermined value and a performance operating rate of the first tier exceeds the specific value.

14. The system according to claim 13, wherein the processor is further programmed to:
increase the third threshold until the usable capacity of the first tier is more than the predetermined value.

15. A system comprising:
a processor;
a plurality of first storage media providing a first tier; and
a plurality of second storage media providing a second tier,
wherein the processor is programmed to:
provide a virtual volume whose data is stored in a plurality of tiers including the first tier and the second tier according to a first threshold value based on whether an access frequency of stored data in a predetermined period is higher than the first threshold value;
migrate first data stored in the second tier to the first tier in a case where an access frequency of the first data in the predetermined period is higher than the first threshold value
measure a plurality of continuous short-cycle load times of second data in the first tier;
estimate a continuous short-cycle load pattern of the second data based on the previously measured plurality of continuous short-cycle load times of the second data; and
migrate the second data stored in the first tier to the second tier if the estimated continuous short-cycle load pattern of the second data satisfies a predetermined condition,
wherein an amount of the first data to be migrated from the second tier to the first tier is controlled at least based on a service life of the first storage media, and wherein the first threshold value increases according to a decrease in the service life of the first storage.

* * * * *